United States Patent
Funk et al.

(10) Patent No.: US 9,706,253 B1
(45) Date of Patent: Jul. 11, 2017

(54) VIDEO FUNNEL ANALYTICS

(75) Inventors: Gregory Allan Funk, San Francisco, CA (US); Nareshkumar Rajkumar, San Jose, CA (US); Vincent Gatto, Jr., San Francisco, CA (US); Theodore Kent Hamilton, Küsnacht (CH)

(73) Assignee: GOOGLE INC, Mountain View, CA (US)

( * ) Notice: Subject to any disclaimer, the term of this patent is extended or adjusted under 35 U.S.C. 154(b) by 244 days.

(21) Appl. No.: 13/528,995

(22) Filed: Jun. 21, 2012

(51) Int. Cl.
*H04H 60/33* (2008.01)
*H04N 21/442* (2011.01)

(52) U.S. Cl.
CPC .............................. *H04N 21/44222* (2013.01)

(58) Field of Classification Search
CPC ............................................. H04N 21/44222
USPC ........................... 726/4; 709/204; 725/13, 34
See application file for complete search history.

(56) References Cited

U.S. PATENT DOCUMENTS

| | | | | |
|---|---|---|---|---|
| 2005/0097594 A1* | 5/2005 | O'Donnell | .............. | G06F 3/147 725/15 |
| 2005/0149964 A1* | 7/2005 | Thomas et al. | ................... | 725/9 |
| 2010/0095317 A1* | 4/2010 | Toebes et al. | ................... | 725/9 |
| 2010/0274673 A1* | 10/2010 | Isaac | ......................... | 705/14.73 |
| 2011/0023060 A1* | 1/2011 | Dmitriev et al. | ............... | 725/34 |
| 2011/0282943 A1* | 11/2011 | Anderson et al. | ............ | 709/204 |
| 2013/0014222 A1* | 1/2013 | Bhatia et al. | ..................... | 726/4 |
| 2013/0054693 A1* | 2/2013 | Chennamadhavuni | ....... | 709/204 |
| 2013/0311380 A1* | 11/2013 | Vines | .................... | G06Q 20/36 705/66 |
| 2013/0332521 A1* | 12/2013 | Olague et al. | ................ | 709/204 |

* cited by examiner

*Primary Examiner* — Joshua Taylor
(74) *Attorney, Agent, or Firm* — Lowenstein Sandler LLP

(57) ABSTRACT

A system and method for generating video funnel analytics is disclosed. The system includes a processor, a configurable goal module, a configurable funnel module, a communication module and an analytics module. The configurable goal module receives a user-configurable video-related goal definition. The configurable funnel module receives a user-configurable video funnel definition based at least in part on the video-related goal definition. The communication module receives a first set of media player state data including data describing viewer interest in a first set of video data playable by a media player included on a user device. The analytics module generates video funnel analytics based at least in part on the video-related goal definition, the video funnel definition and the first set of media player state data.

24 Claims, 15 Drawing Sheets

500

General Method

700

1100

Enter Goal and Funnel Information

Goal Name: [_____] —1110
Goal name will appear in conversion reports.

Active Goal: [● On  ○ Off] —1120

Goal Position: [Set 1, Goal 1 ▽] —1130
Changing goal position will not move historical data for this goal Goal Type:

Please select a video goal type
- ○ URL Destination
- ● URL Destination with Video View
- ○ Time on Site
- ○ Pages/Visit
- ○ Number of Videos Viewed
- ○ Minutes of Video Watched
- ○ Number of Ads Watched
  •
  •
  •
- ○ Custom Type

Enter Goal And Funnel Information (Cont.)

Goal Details:

1150 →

- Match Type: [Exact Match ▽] ⌐1152
- Goal URL: [_____] ⌐1154
- Case Sensitive: ☐ URLs entered above must exactly match the capitalization of visited URLs  ⌐1156
- Goal Value: [____] ⌐1158

Video Funnel:

| Step 1: | url1 | Webpage #1 | ☐ Optional Step ⌐1190 |
| Step 2: | event(s) | Video view | Video ID(s) ⌐1160 |
| Step 3: | url2 | Webpage #2 | |
| ⋮ | ⋮ | ⋮ | |
| Step N: | urlN | Webpage #N | |

VIDEO FUNNEL ANALYTICS

TECHNICAL FIELD

The present disclosure generally relates to video analysis and, more specifically, to video funnel analytics.

BACKGROUND

Entities that publish content, such as video data, to one or more websites typically desire analytics data about the published content. For example, if video data is published to one or more websites, the publishers may seek information about the number of times the video data is viewed. If the video data is functioning as an advertisement, the publisher may want to know the number of users watching the video data or other metrics describing performance of the video data.

In some scenarios, publishers of video content may prefer to see configurable analytics data related to video content. For example, publishers may be interested in knowing how the presence of video content on a webpage may effect a viewer's interaction with that page and/or a viewer's downstream behavior such as a viewer's willingness to make a purchase. Publishers may also be interested in understanding and/or directing a viewer's navigational flow through a website or series of websites due to the presence of video content. However, existing technologies for generating analytics data do not provide the functionality allowing publishers to easily discern the effect video content may have on the viewer when it is included on a webpage. Also, existing technologies are incapable of generating analytics information for a specific navigational flow related to the video content being available on the webpage, nor do existing technologies provide functionalities that relate viewer interaction with the media player to a specific navigational flow leading to a specific outcome desired by the publisher. Further, existing technologies are incapable of allowing publishers to customize a media player to report viewer interaction with the video content in a manner related to a specific navigational flow and outcome.

SUMMARY

Embodiments disclosed herein provide a system and method for generating video funnel analytics. The system includes a processor, a configurable goal module, a configurable funnel module, a communication module and an analytics module. The configurable goal module receives a user-configurable video-related goal definition. The configurable funnel module receives a user-configurable video funnel definition based at least in part on the video-related goal definition. The communication module receives a first set of media player state data including data describing viewer interest in a first set of video data playable by a media player included on a user device. The analytics module generates video funnel analytics based at least in part on the video-related goal definition, the video funnel definition and the first set of media player state data.

The method includes the steps of receiving a user-configurable video-related goal definition, receiving a user-configurable video funnel definition based at least in part on the video-related goal definition, receiving a first set of media player state data including data describing viewer interest in a first set of video data playable by a media player included on a user device, and generating video funnel analytics based at least in part on the video-related goal definition, the video funnel definition, and the first set of media player state data.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

Embodiments are illustrated by way of example, and not by way of limitation in the figures of the accompanying drawings in which like reference numerals are used to refer to similar elements.

FIGS. 12A and 12B are graphical representations of an exemplary graphical user interface for defining a video-related goal and video funnel.

DETAILED DESCRIPTION

Figure 1:
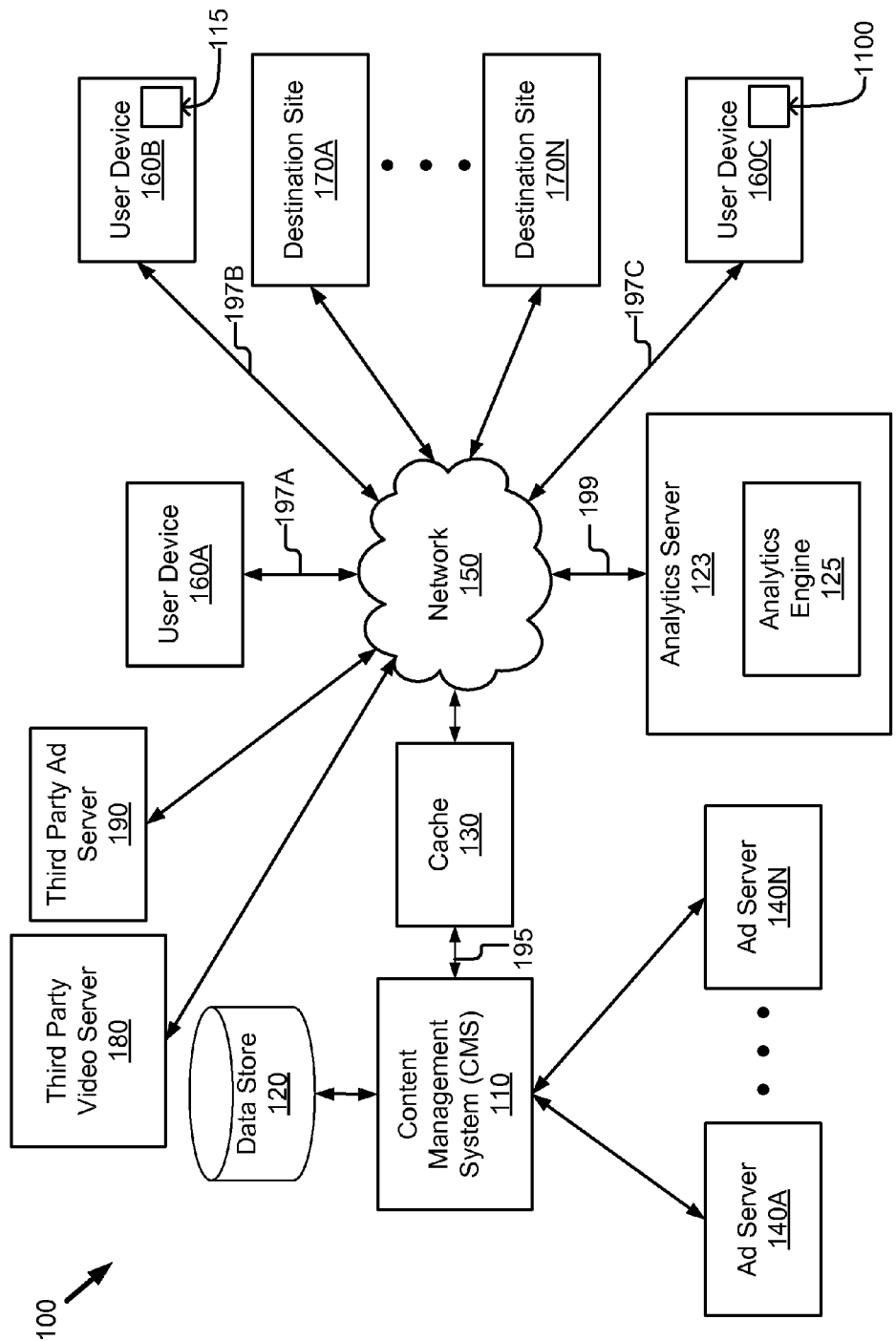
FIG. 1 is a high-level block diagram illustrating one embodiment of a system for generating video funnel analytics.

A system and method for generating video funnel analytics is described below. In the following description, for purposes of explanation, numerous specific details are set forth to provide a thorough understanding of the various embodiments. However, it will be apparent to one skilled in the art that the various embodiments can be practiced without these specific details. In other instances, structures and devices are shown in block diagram form in order to avoid obscuring the certain details. For example, an embodiment is described below with reference to user interfaces and particular hardware. However, other embodiments can be described with reference to any type of computing device that can receive data and commands, and any peripheral devices providing services.

Reference in the specification to "one embodiment" or "an embodiment" means that a particular feature, structure or characteristic described in connection with the embodiment is included in at least one embodiment. The appearances of the phrase "in one embodiment" in various places in the specification are not necessarily all referring to the same embodiment.

Some portions of the following detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "generating," "computing," "analyzing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present embodiments also relate to an apparatus for performing the operations herein. This apparatus may be specially constructed for the required purposes, or it may be a general-purpose computer selectively activated or reconfigured by a computer program stored in the computer. The embodiments disclosed may take the form of an entirely hardware embodiment, an entirely software embodiment executing on various hardware, or an embodiment including both hardware and software elements. One embodiment is implemented in software comprising instructions or data stored on a computer-readable storage medium, which includes but is not limited to firmware, resident software, microcode or another method for storing instructions for execution by a processor.

Furthermore, the embodiments may take the form of a computer program product accessible from a computer-usable or computer-readable storage medium providing program code for use by, or in connection with, a computer or any instruction execution system. For the purposes of this description, a computer-usable or computer readable storage medium is any apparatus that can contain, store or transport the program for use by or in connection with the instruction execution system, apparatus or device. The computer-readable storage medium can be an electronic, magnetic, optical, electromagnetic, infrared, or semiconductor system (or apparatus or device) or a propagation medium. Examples of a tangible computer-readable storage medium include a semiconductor or solid state memory, magnetic tape, a removable computer diskette, a random access memory (RAM), a read-only memory (ROM), a rigid magnetic disk, an optical disk, an EPROM, an EEPROM, a magnetic card or an optical card. Examples of optical disks include compact disk-read only memory (CD-ROM), compact disk-read/write (CD-R/W) and digital video disc (DVD).

A data processing system suitable for storing and/or executing program code includes at least one processor coupled directly or indirectly to memory elements through a system bus. The memory elements may include local memory employed during actual execution of the program code, bulk storage and cache memories providing temporary storage of at least some program code in order to reduce the number of times code must be retrieved from bulk storage during execution. In some embodiments, input/output (I/O) devices (such as keyboards, displays, pointing devices or other devices configured to receive data or to present data) are coupled to the system either directly or through intervening I/O controllers.

Network adapters may also be coupled to the data processing system to allow coupling to other data processing systems or remote printers or storage devices through intervening private or public networks. Modems, cable modem and Ethernet cards are just examples of the currently available types of network adapters.

Finally, the algorithms and displays presented herein are not inherently related to any particular computer or other apparatus. Various general-purpose systems may be used with programs in accordance with the disclosure herein, or it may prove convenient to construct more specialized apparatus to perform the required method steps. The required structure for a variety of these systems will appear from the description below. It will be appreciated that a variety of programming languages may be used to implement the disclosure of the embodiments as described herein.

System Overview

FIG. 1 shows one embodiment of a system 100 for generating video funnel analytics. In the embodiment depicted by FIG. 1, the system 100 includes a content management system (CMS) 110, a data store 120, an analytics server 123 that includes an analytics engine 125, a cache 130, one or more advertisement servers ("ad servers") 140A-140N (also referred to individually and collectively as 140), a network 150, a third party video server 180, a third party ad server 190, one or more user devices 160A, 160B, 160C (also referred to individually and collectively as 160) and one or more destination sites 170A-170N (also referred to individually and collectively as 170). Additionally, FIG. 1 also illustrates at least one media player 115 operating on a user device 160 and at least one graphical user interface 1100 displayed on a user device 160. However, in other embodiments, the media player 115 could operate on any or all of the user devices 160A, 160B, 160C, the graphical user interface 1100 could be displayed on any or all of the user devices 160A, 160B, 160C, and the system 100 could include different and/or additional components other than those depicted by FIG. 1.

The components of the system 100 are communicatively coupled to one another via components of one or more networks. For example, the analytics server 123 is communicatively coupled to the network 150 via a signal line 199. The content management system 110 is communicatively coupled to the cache 130 via a signal line 195. The user device 160A is communicatively coupled to the network 150 via a signal line 197A. The user device 160B is communicatively coupled to the network 150 via a signal line 197B. The user device 160C is communicatively coupled to the network 150 via a signal line 197C.

The content management system 110 includes one or more processors and one or more storage devices storing data or instructions for execution by the one or more processors. For example, the content management system 110 is a server, a server array or any other computing device, or group of computing devices, having data processing and communication capabilities. The content management system 110 receives video data and metadata from one or more publishers operating on one or more user device 160 or other sources. A publisher is a user that publishes a video on one or more of the content management system 110, the third party video server 180 and the destination site 170. However, in another embodiment, a publisher may publish a video in the form of an ad on one or more of the third party ad server 190, the ad servers 140 of the content management system 119, the analytics server 123, or other ad server sources. The content management system 110 associates the metadata with the video data and communicates the metadata, video data and an association between the video data and metadata to the data store 120, allowing the data store 120 to maintain relationships between video data and the metadata. In one embodiment, the content management system 110 receives a search query for a video from a user device 160 and retrieves video data and metadata associated with the video from the data store 120 based at least in part on the search query.

In one embodiment, the content management system 110 includes data or instructions for generating a media player 115 used to present the video data when executed by a processor. For example, the content management system 110 generates embed code that can be included in a webpage so that the media player 115 can be embedded in the webpage when the webpage is loaded in a browser. The content management system 110 generates the data for creating the media player 115 (e.g., embed code) based at least in part on the video data and the metadata associated with the video data.

In another embodiment, the content management system 110 generates graphical data for providing one or more user interfaces to a publisher that allow the publisher to customize a media player 115 for presenting video data to viewers. For example, the graphical data generated by the content management system 110 when executed by a processor depicts a user interface for a publisher to customize the branding or skin of an embedded media player 115 by modifying configuration settings of the media player 115. As another example, the graphical data generated by the content management system 110 depicts another user interface for a publisher to customize the temporal location and placement of supplemental content (e.g., an advertisement) within video data when the video data is presented by a media player 115 operating on a user device 160. The content management system 110 is further described below with reference to FIGS. 3A and 3B.

In another embodiment, the destination site 170 provides the same functionality as the content management system 110, including the functionality for generating a media player 115 used to present video data when executed by a processor, and the functionality to allow the publisher to customize a media player 115 for presenting video data to viewers.

The data store 120 is a non-volatile memory device or similar persistent storage device and media communicatively coupled to the content management system 110 via a signal line. The data store 120 stores video data and metadata associated with the video data. For example, the data store 120 and the content management system 110 exchange data with each other via the network 150. Alternatively, the data store 120 and the content management system 110 exchange data via a dedicated communication channel. While the embodiment shown by FIG. 1 depicts the data store 120 and the content management system 110 as discrete components, in other embodiments a single component includes the data store 120 and the content management system 110.

In one embodiment, the data store 120 includes one or more tables associating metadata with video data. For example, the data store 120 includes a table where an entry in the table includes a field identifying the video data and additional fields that include metadata associated with the video data. Additionally, the data store 120 includes additional tables identifying data used by a destination site 170 when storing video data for access by a user device 160. In one embodiment, the data store 120 includes data mapping metadata associated with video data to data used by a destination site 170. The mapping of metadata associated with video data to data used by a destination site 170 allows the data store 120 to automatically map metadata associated with video data with one or more data fields used by a destination site 170, which beneficially reduces the time for a destination site 170 to store and communicate video data from the data store 120 to a user device 160. In one embodiment, the data store 120 or the content management system 110 includes an index to expedite identification and/or retrieval of stored data from the data store 120.

The analytics server 123 is one or more devices having at least one processor coupled to at least one storage device including instructions for execution by the processor. For example, the analytics server 123 is one or more servers or other computing devices having data processing and data communication capabilities. The analytics server 123 receives one or more video funnels for video-related goals, tracks each instance of the media player 115 loaded on one or more user devices 160 by receiving information about events that occur in association with a media player 115, and generates video funnel analytics based at least in part on the events and video funnels.

A video funnel is a series of steps and/or intermediate goals that must be achieved in order to convert a video-related goal. These steps and/or intermediate goals are defined in association with the video-related goal. Video funnel analytics are analytics that describe and/or illustrate the effectiveness of the video funnel in directing (i.e., funneling) viewers and/or customers toward converting an associated video-related goal. For example, when defining a video-related goal, a user defines a video funnel, i.e., the series of steps or intermediate goals, that must be achieved in order to convert the video-related goal. In one embodiment, the video-related goal is converted when the last step of the video funnel is satisfied. Satisfaction of an associated video funnel is determined using associated media player state data and/or website usage data (or website analytics data generated therefrom).

The analytics server 123 receives pings from a media player 115 loaded in a user device 160. The data included in the pings describes a state of a media player 115 or an action taken by the media player 115 (also collectively referred to herein as media player state data). The pings, for example, are received in the form of hypertext transfer protocol "get" or "post" requests sent from the media player 115 via a communication device of the user device 160, and include parameters identifying a video and an event occurring in association with the video (e.g., a video id, a video version, an embedded URL, an address of the media player 115, and a video load request, etc.). The analytics server 123 analyzes the pings to generate video analytics data. Video analytics data is data describing interaction among a video, a media player 115, and a viewer. For example, the video analytics data describe satisfaction of series of steps of a video funnel configurable by a publisher, some of which are required to occur to achieve a particular outcome or result (i.e., goal) sought by the publisher.

In one embodiment, the analytics server also tracks websites by receiving website usage data from the one or more user devices 160. Website usage data is data describing interaction between one or more webpages and a user device 160 (also referred to herein as "webpage usage data"). For example, the website usage data indicate the webpages viewed in a web browser running on the user device 160 during a visit to a website, and the total time the user spent on the site. In one embodiment, the website usage data include user interaction with a webpage. For example, the website usage data include data describing that a user has clicked a link connected to a video.

In another embodiment, the analytics server 123 also analyzes the website usage data and generates web analytics data from the website usage data. The web analytics data is data describing results yielded from analyzing the website usage data. For example, the web analytics data include one or more of website click analytics describing interactions with a webpage within a website, the number of times a webpage has been loaded, the click-through rate of an advertisement, the number of users who clicked on an advertisement, the number of times an advertisement has been delivered, the number of times the webpage has been accessed by unique users, and/or other types of analytics data describing interaction with webpages within a website. In one embodiment, the web analytics data include one or more statistical results from the website usage data. For example, the web analytics data include statistical data describing a distribution of website visits according to different geographic locations for a webpage.

The analytics server 123 can use the website usage data and media player state data to generate analytics data describing the effect of video content on website usage and, conversely, how elements within a webpage affect user interaction with video data. For example, the analytics server 123 analyzes website usage data and media player state data to determine whether inclusion of a product video on a webpage of a particular product satisfies a video funnel leading to a video-related goal of achieving a 20% increase in sales of that product for a particular time period.

The analytics server 123 generates one or more reports that include video funnel analytics describing satisfaction of a user-defined video-related goal based at least in part on the satisfaction of an associated video funnel. For example, the analytics server 123, using the website usage data and the media player state data, generates a report including video funnel analytics that describe the number of visitors who proceeded through a series of predetermined steps (e.g., watching a product related video, clicking link to purchase product, etc.) required to satisfy a video-related goal (e.g., the purchase of a particular product), the number of visitors who disengaged at one step or another (e.g., quit the buying process), and the number of visitors who successfully completed all of the steps and converted the video-related goal. The analytics server 123 and the analytics engine 125 are further described below with reference to FIG. 4 and methods for generating video funnel analytics based at least in part on the video funnel and using system 100 are further described below with reference to at least FIGS. 6-8.

The cache 130 is coupled to the content management system 110 using the network 150 or using a direct communication channel between the content management system 110 and the cache 130. When a user device 160 or a destination site 170 retrieves video data from the data store 120, the content management system 110 communicates the video data to the cache 130, which stores a copy of the retrieved video data. Similarly, a search query for video data from a user device 160 or a destination site 170 is initially transmitted via the network 150 to the cache 130 and the video data is communicated to the user device 160 or the destination site 170 by the cache 130 if a copy of the video data is stored by the cache 130. If the cache 130 does not include a copy of the video data, the search query is communicated from the cache 130 to the content management system 110 to retrieve the video data. Hence, the cache 130 expedites retrieval of video data. While FIG. 1 illustrates a single cache 130, in other embodiments, the system 100 may include multiple caches 130.

The one or more advertisement servers ("ad servers") 140A-140N are one or more computing devices having a processor and a computer-readable storage medium storing advertisements ("ads" if plural, or "ad" if singular) and rules for selecting advertisements. An ad server 140 communicates with the content management system 110 via the network 150 or via a communication channel with the content management system 110. In one embodiment, an ad server 140 communicates with a destination site 170, the analytics server 123, the third party video servers 190 or a user device 160 via the network 150 to communicate advertisements for presentation when a webpage is accessed. An ad server 140 also includes one or more of rules for targeting advertisements to specific users, rules for targeting advertisements to be displayed in conjunction with types of content, rules for targeting advertisements to specific locations or Internet Protocol (IP) addresses or other rules for selecting and/or targeting advertisements.

An ad server 140 receives metadata associated with video data from the content management system 110 and selects advertisements for presentation in conjunction with the video data based on the metadata. For example, the ad server 140 selects stored advertisements based on keywords associated with the video data. Thus, modification of the metadata associated with the video data enables modification of the advertisements presented in conjunction with the video data. In another embodiment, the advertisement is a video which constitutes the main video to be played by a media player 115, and the ad server receives a request for the video advertisement based on a video ID associated with the video advertisement.

The network 150 is a conventional network and may have any number of configurations such as a star configuration, a token ring configuration, or another configuration known to those skilled in the art. In various embodiments, the network 150 is a wireless network, a wired network or a combination of a wireless and a wired network. Furthermore, the network 150 may be a local area network (LAN), a wide area network (WAN) (e.g., the Internet) and/or any other interconnected data path across which multiple devices may communicate. In yet another embodiment, the network 150 may be a peer-to-peer network.

The network 150 may also be coupled to, or include, portions of a telecommunications network for communicating data using a variety of different communication protocols. In yet another embodiment, the network 150 includes a Bluetooth communication network and/or a cellular communications network for sending and receiving data. For example, the network 150 transmits and/or receives data using one or more communication protocols such as short messaging service (SMS), multimedia messaging service (MMS), hypertext transfer protocol (HTTP), direct data connection, WAP, email or another suitable communication protocol.

The one or more user devices 160A, 160B, 160C are computing devices having data processing and data communication capabilities. For example, a user device 160 comprises a desktop computer, a laptop computer, a netbook computer, a tablet computer, a smartphone, a set-top box/unit, an Internet Protocol-connected TV, a smart TV, or the like. In one embodiment, different user devices 160A, 160B, 160C comprise different types of computing devices. For example, the user device 160A is a smartphone, the user device 160B is a tablet computer and the user device 160C is a laptop computer. In one embodiment, a plurality of viewers each have a user device 160 that includes a media player 115 to view video data.

In one embodiment, a user inputs a search query into a user device 160 and the user device 160 transmits the search query to one of a destination site 170, the content management system 110 and the third party video server 180 via the network 150. The user device 160 then receives video data matching the search query from one of the destination site 170, the content management system 110 and the third party video server 180 via the network 150 for presenting the video data to the user via a media player 115. Similarly, the user device 160 receives metadata associated with a video from a publisher of the video and transmits the metadata to one of a destination site 170, the content management system 110 and the third party video server 180 via the network 150.

In another embodiment, a user device 160 receives graphical data for depicting a graphical user interface 1100 that allows a publisher to input a video-related goal and a video funnel associated with video data to be played by a media player 115. For example, the user device 160 provides a graphical user interface 1100 with one or more input fields, such as text entry fields, drop-down boxes, and check boxes, allowing the publisher to define criterion that must be met to satisfy the video funnel and goal.

In another embodiment, a user device 160 receives graphical data for depicting a graphical user interface that allows a publisher to customize a media player 115 for presenting a video. For example, the user device 160 displays a user interface on a screen of the user device 160 having one or more fields and drop-down boxes allowing a publisher to customize the temporal location and placement of an ad for a video.

The destination sites 170A-170N are computing devices having data processing and data communication capabilities, such as web servers. A destination site 170 includes data describing a website that includes one or more webpages and communicates one or more webpages to a user device 160 via the network 150. One or more webpages stored by a destination site 170 include data or instructions for presenting video data via a media player 115 when executed on the user device 160. In one embodiment, a destination site 170 retrieves video data and customizations of the media player 115 from the content management system 110, allowing the destination site 170 to present video data using the architecture of the content management system 110. In another embodiment, a destination site 170 receives video data and configuration data for a media player 115 from the content management system 110 and embeds the video data into webpages to present the video data. For example, a destination site 170 receives embed code describing inclusion and configuration of the media player 115 and includes the embed code in a webpage. In yet another embodiment, a destination site 170 stores video data and customizations of the media player 115 locally and the destination site 170 retrieves the video data and the customizations from the local store and embeds the video data into webpages to present the video data. In this other embodiment, the destination site 170 implements some or all of the functionalities provided by the content management system 110.

The third party video server 180 is one or more devices having at least one processor coupled to at least one storage device including instructions for execution by the processor. For example, the third party video server 180 is a conventional server, a server array or any other computing device or group of computing devices, having data processing and communication capabilities. The third party video server 180 is communicatively coupled to other components of the system 100 via the network 150. In one embodiment, the third party video server 180 receives video data and metadata from one or more publishers operating on one or more user device 160 via the network 150. The third party video server 180 provides the video data to other users via the network 150. For example, a publisher publishes a video on the third party video server 180, the third party video server 180 transmits the video via the network 150 to a user device 160, and a media player 115 on the user device 160 presents the video data to a viewer of the user device. In one embodiment, the third party video server 190 implements some or all of the functionalities provided by the content management system 110.

The third party ad server 190 is any computing device having a processor and a computer-readable storage medium storing advertisements and rules for selecting advertisements. For example, the third party ad server 190 selects an advertisement for a video and sends the advertisement to a user device 160 when the video is played by a media player 115 on the user device 160. In another example, the third-party ad server 190 selects a video advertisement and sends the video advertisement to a user device 160 when the video advertisement is requested by a media player 115 on the user device 160. In this example, the video advertisement constitutes the video data being played by the media player 115.

The third party ad server 190 is communicatively coupled to other components of the system 100 via the network 150. For example, the third party ad server 190 communicates rules for selecting advertisements with the analytics server 123 via the network 150. In one embodiment, the third party ad server 190 implements some or all of the functionalities provided by the ad server 140. In another embodiment, the third party ad server 190 implements some or all of the functionalities provided by the third party video server 180. While the third party video server 180 and the third party ad server 190 are depicted as being separate computing devices in FIG. 1, the system 100 is not limited to such a configuration, and the third party ad server 190 and the third party video server 180 may be implemented, for example, in the same computing device or in other computing devices of system 100.

User Device 160

Figure 2:
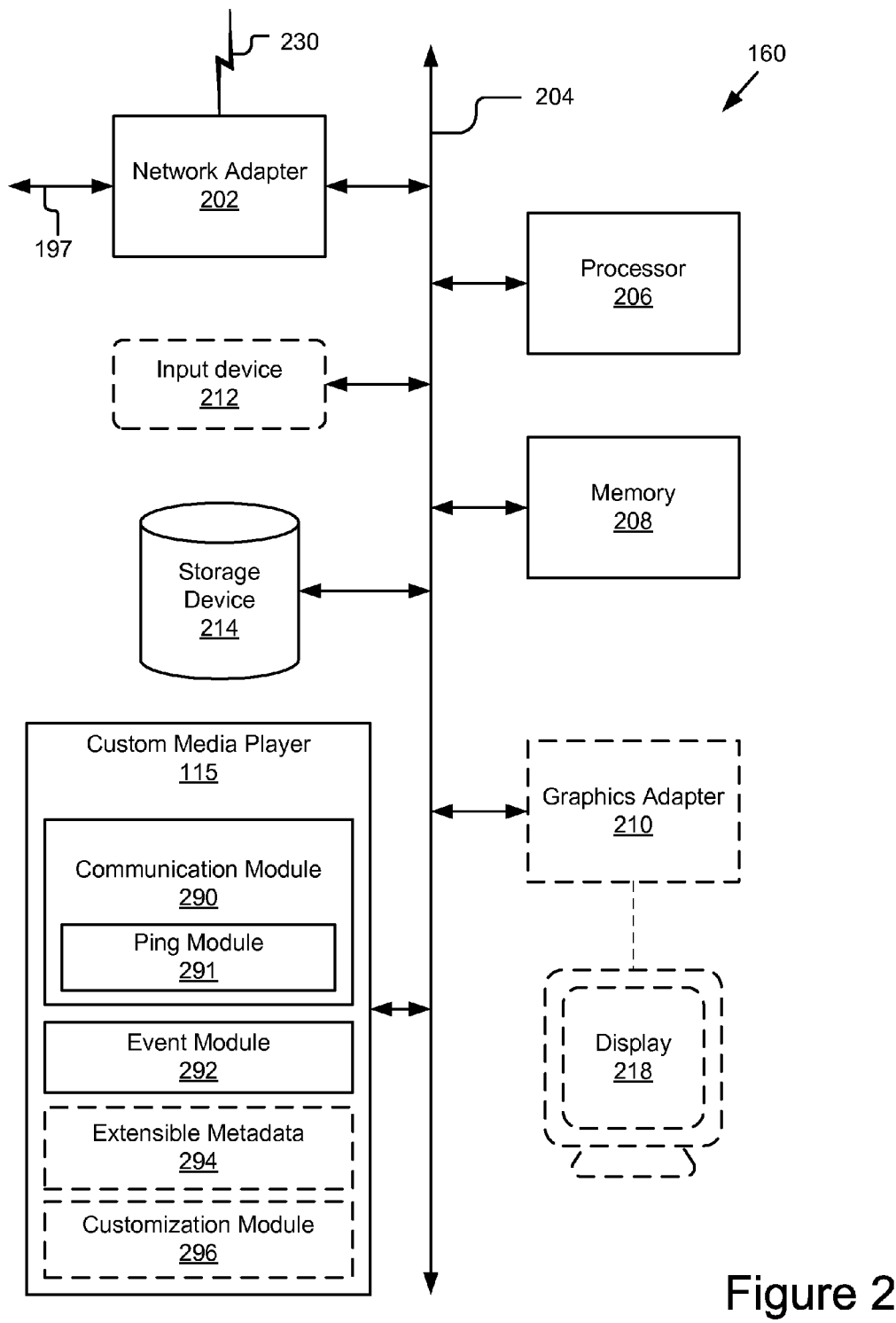
FIG. 2 is a block diagram illustrating one embodiment of a user device.

FIG. 2 is a block diagram illustrating one embodiment of a user device 160. As illustrated in FIG. 2, the user device 160 includes a network adapter 202 coupled to a bus 204. According to one embodiment, also coupled to the bus 204 are at least one processor 206, a memory 208, a graphics adapter 210, an input device 212, a storage device 214 and a media player 115. In one embodiment, the functionality of the bus 204 is provided by an interconnecting chipset. The user device 160 also includes a display 218, which is coupled to the graphics adapter 210. The input device 212, the graphics adapter 210 and the display 218 are depicted using dashed lines to indicate that they are optional features of the user device 160.

The network adapter 202 is an interface that couples the user device 160 to a local or wide area network. For example, the network adapter 202 is a network controller that couples the user device 160 to the network 150 via the signal line 197 for data communication between the user device 160 and other components of the system 100. In one embodiment, the network adapter 202 is communicatively coupled to a wireless network (e.g., a wireless local area network) via a wireless channel 230.

The processor 206 may be any general-purpose processor. The processor 206 comprises an arithmetic logic unit, a microprocessor, a general purpose controller or some other processor array to perform computations and provide electronic display signals to the display 218. The processor 206 is coupled to the bus 204 for communication with other components of the user device 160. The processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The user device 160 also includes an operating system executable by the processor 206 such as, but not limited to, WINDOWS®, MacOS X, Android, or UNIX® based operating systems.

The memory 208 holds instructions and data used by the processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory such as a hard disk drive or flash drive for storing information on a more permanent basis. The memory 208 is coupled to the bus 204 for communication with the other components of the user device 160. In one embodiment, the media player 115 is stored in the memory 208 and executable by the processor 206.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for the processor 206 and comprises one or more devices including a hard disk drive, a floppy disk drive, a CD-ROM device, a DVD-ROM device, a DVD-RAM device, a DVD-RW device, a flash memory device, or some other mass storage device known in the art. For clarity, instructions and/or data stored by the storage device 214 are described herein as different functional "modules," where different modules are different instructions and/or data included in the storage device that cause the described functionality when executed by the processor 206.

The input device 212 is any device to input data to the user device 160. For example, the input device 212 is one of a mouse, track ball or other type of pointing device to input data to the user device 160. In one embodiment, the input device 212 includes one or more of a keyboard (e.g., a QWERTY keyboard), a microphone, a web camera or similar audio or video capture device. In another embodiment, in addition to or in the lieu of the input device 212, a user of the user device 160 interacts with the user device using one or more fingers of the user via the display 212, which is a touch-screen display capable of receiving input from the one or more fingers of the user. In this embodiment, the user device 160 can execute via the processor 206 instructions emulating a keyboard capable of receiving input from the one or more fingers of the user via the display 212.

The graphics adapter 210 displays images and other information on the display 218. The display 218 is a conventional type such as a liquid crystal display (LCD) or any other similarly equipped display device, screen or monitor. The display 218 represents any device equipped to display electronic images and data as described herein. In one embodiment, the display is a touch-screen display capable of receiving input from one or more fingers of the user.

The media player 115 includes software and routines executable by the processor 206 to present video data to a user. For example, the media player 115 is a video player executed by the processor 206 to receive and display a stream of video data received from a video content provider, such as the content management system 110, the destination site 170 or the third party video server 180, and present the video data to a user via the display 218.

When the media player 115 is implemented by the user device 160, a media player session is established. A media player session spans all activity that happens within the lifetime of the media player and allows the media player 115 to track events occurring throughout a variety of different viewing experiences occurring within the media player 115. For example, during a session, the media player 115 tracks events occurring during the view of one or more videos, navigation between videos using playlists, and/or displaying of interactive media-rich or other advertisements, and sends the events to the analytics server 123. In an embodiment where multiple instances of a media player 115 are included in a single webpage, each instance of the media player 115 has its own unique session and session ID.

In one embodiment, the media player 115 is embedded in one or more webpages served to a user device 160 by one of the destination site 170, the third party video server 180 and the content management system 110. For example, a web browser launched on the user device 160 loads the webpage and executes an embed code for a media player 115 provided by the destination site 170 to invoke a media player 115. The media player 115 presents video data according to the embed code. During the invocation of the media player 115, the user device 160 receives customization settings for the media player 115 from one of the destination site 170, the third party video server 180 and the content management system 110. The customization settings customize the look, feel, feature set and operation of the media player 115. In this embodiment, the session ID associated with the media player 115 is distinct from the browser session(s) associated with the one or more webpages.

In one embodiment, a viewer's video-related activity occurring within multiple instances of a media player 115 over a predetermined period of time on a website can be connected using a website session and corresponding website session ID. For example, the when a viewer initially accesses webpage of a destination site 170, a third party video server 180, or a content management system 110, the web server of the destination site 170, the third party video server 180, or the content management system 110 generates and stores a session ID based on a unique identifier such as user information or location information (e.g., user ID, IP address, etc.). The viewer's web browser also stores a copy of the session ID (e.g., in a cookie) for connecting the viewer's video-related activity occurring in association with the multiple instances of the media player 115. Subsequent visits to the destination site by the viewer are then linked together using the stored session ID or other information such as viewer account information stored in, for example, the cookie.

In one embodiment, the media player 115 is a video player customized by a publisher to track custom events for reporting to the analytics server 123. For example, the media player 115 is tailored by a publisher using extensible metadata 294 or the customization module 296 to include one or more customized features. Examples of a feature customized by a publisher include, but are not limited to, adding an age-gating function, adding a user login interface, generating a queue for playback, saving a video for viewing later, adding domain restrictions and/or geographic restrictions for viewing a video and requesting user's agreement to terms and conditions for viewing a video, etc. The domain restrictions to the media player 115 limit domains in which the media player 115 is able to present video data. The geographic restrictions limit geographic regions in which the media player 115 is able to present video data. For example, the domain restrictions and/or the geographic restrictions do not allow the media player 115 to play the video data outside the United States.

The media player 115 implements features customized by the publisher invoking actions triggered by customization of the player. For example, the media player 115 implements an age-gating function by requesting a user to confirm that he/she is at least 18 years old. Examples of an action include, but are not limited to, determining whether a user is above a certain age, requesting a user to log in, generating a queue for the user, generating a "save" button for the user to click and cause the user device 160 to save the video for viewing later, determining a location (e.g., an IP address) for a user device 160, applying domain restrictions and/or geographic restrictions, etc. In one embodiment, a publisher customizes a media player 115 to track the level of viewer interest in the video data being presented by the media player 115. For example, the publisher customizes the media player 115 to track viewer mouse-over interaction with an interactive rich media advertisement displayed by the media player 115.

In the depicted embodiment, the media player 115 includes, among other things, a communication module 290, an event module 292, extensible metadata 294 and a customization module 296. These components of the media player 115 are configured for communication with each other and other elements of the user device 106. For example, when executed by the processor 206, the media player 115 and its constituent components communicate via the bus 204 with other elements of the media player 115. The extensible metadata 294 and the customization module 296 are depicted with dashed lines to indicate that they are optional features of the media player 115.

The communication module 290 includes software and routines executable by the processor 206 for handling communication between the media player 115 via the bus 204 and other components of the system 100 via the network 150. In one embodiment, the communication module transmits requests for a video stream to one of the destination site 170, the third party video server 180 and the content management system 110, and receives transmission of the video stream from one of the destination site 170, the third party video server 180 and the content management system 110. In another embodiment, the communication module 290 receives a data stream for an advertisement from one of the ad server 140, the third party ad server 190 and the analytics server 123.

The communication module 290, in one embodiment, includes a ping module 291 communicatively coupled to the other modules of the media player 115. The ping module 291 includes software and routines for generating and sending, in the form of one or more pings, media player state data describing operation of the media player 115 and viewer interest in, and interaction with, the media player 115 to the analytics server 123 via the network 150. In one embodiment, a ping includes one or more of a video identification ("video ID") to identify a video, a video version (e.g., a second version of a video), a location (e.g., an IP address) for a user device 160, an embedded uniform resource locator ("eURL") referring to the webpage on which a player is embedded, and data describing an event. The event included in the ping can be, for example, a custom event triggered by customization of the media player 115 by the publisher or an event that that does not require customization to detect.

In one embodiment, the ping module 291 receives data describing one or more events detected by the event module 292 during a media player session from the event module 292 and generates and sends (pings) the data describing the one or more events to the analytics server 123. For example, via the communication module 290, the ping module 291 generates and sends a hypertext transfer protocol "get" or "post" request that includes parameters identifying a video and an event occurring in association with the video (e.g., a video id, a video version, an embedded URL, an address of the media player 115, an indication that video data has been loaded, etc.). The analytics server 123 then analyzes the media player state data sent by the ping module 291 to determine its relevance to one or more steps of a video funnel input by a publisher into the analytics engine 125.

The event module 292 includes software and routines for detecting an event for the media player 115. An event describes a state of the media player 115 triggered by an action taken or a non-action not taken in the media player 115. For example, when the media player 115 is playing video data being streamed from the content management system 110, and the viewer of the video data maximizes the media player to fill the viewable area of the display for optimal viewing performance, a media player maximizing event is detected by the event module 292 and data describing this event is sent to the ping module 291, and the ping module, in turn, instructs the user device 160 to send the data describing the event to the analytics server 123 via the network 150.

Examples of an event include data describing video playback such as an indication that the media player 115 is loaded on a webpage by the user device 160, an indication that an ad is starting to play, a report of the viewing progress of an ad at a predetermined interval (e.g., 5 seconds), an indication of the viewing progress of an ad at a checkpoint (e.g., 25%, 50%, 75% and 100% of an ad), an indication that an ad is finished playing, an indication that a video has begun playing, an indication of the viewing progress of a video at a predetermined interval (e.g., 10 seconds), an indication of the viewing progress of a video at a checkpoint (e.g., 25%, 50%, 75% and 100% of a video), an indication a video has completed playing, and a length of time that the media player 115 has played a video. Examples of an event also include viewer engagement data such as an indication of a viewer preference for a video (the viewer "liked" or "+1'd" the video), an indication a viewer abandoned an advertisement being displayed by the media player 115, an indication a viewer interacted with an advertisement being displayed by the media player 115, an indication a viewer changed a volume level of the media player 115, an indication a viewer placed the media player 115 in full screen mode, an indication a viewer replayed a segment of a video, an indication a viewer fast-forwarded a video, an indication a viewer rewound a video, an indication a viewer paused playing of a video, an indication a viewer stopped playing a video, and a viewer instruction to share a video, for example, via email or a social networking website. Persons of ordinary skill in the art will recognize that other events may be detected by the event module 292 and sent to the analytics server 123 via the ping module 291.

In one embodiment, an event detected by the event module 292 is a custom event. A custom event is an event triggered by a feature of the media player 115 customized by a publisher. For example, if a publisher has added a user login function to the media player 115, the event module 292 detects a login event when the media player 115 prompts the user to log in. The event module 292 sends the data describing the detected event to the ping module 291 for transmission to the analytics server 123.

Examples of a custom event include, but are not limited to, player loads, video views, viewing 25% of a video, viewing 50% of a video, viewing 75% of a video, viewing 100% of a video, automatic plays, manual plays, monetizable views, an ad being watched, an ad being clicked, an ad being abandoned, sharing a video via email, sharing a video via an embed copy, sharing a video via a website, marking a video as a liked or disliked video, marking a video as a favorite video, turning caption on or off for a video, switching a caption from one language to another language, adding an comment for a video, subscribing a video, dropping off a video, age-gating, user login, queue for playback, saving for later view and any other events triggered by a publisher's customization of the media player 115. This list of custom events is non-exhaustive and persons of ordinary skill in the art will recognize that the media player 115 may track other custom events.

The customized extensible metadata 294 is data used to configure the media player 115. In one embodiment, the customized extensible metadata 294 includes configuration settings for the media player 115 to implement one or more features added by a publisher. For example, when the media player 115 is loaded by the user device 160, the media player 115 is configured according to the customized extensible metadata 294 so that one or more features customized by the publisher are added to the media player 115. A configuration setting is a set of configuration information describing how a media player 115 is configured. For example, a configuration setting describes that an age-gating function is added to the media player 115 so that a user is requested to input an age when viewing a video.

In one embodiment, the customized extensible metadata 294 is stored in the storage device 214 and retrieved by the media player 115 when the media player 115 is loaded. In another embodiment, the media player 115 receives the customized extensible metadata 294 from the player configuration module 328 of the content management system 110 via the network 150 and stores the customized extensible metadata 294 in the storage device 214. The player configuration module 328 is described below with reference to FIG. 3B.

The customization module 296 includes application programming interfaces ("APIs") configured to allow a publisher to customize a media player 115 according to the publishers preferences. In one embodiment, the customization module 296 includes APIs that invoke the behavioral features of the media player 115. The publisher uses a set of development tools such as a software development kit ("SDK") to add custom functions to the media player 115 via the APIs. Examples of custom functions include an age-gating function, a user login interface, a queue for playback, a save feature to save a video for later viewing, domain restrictions and/or geographic restrictions for viewing a video, a gate requesting agreement to terms and conditions for viewing a video, a monitor that monitors a specific viewer interaction with the media player 115, etc.

Content Management System (CMS) 110

Figure 3A:
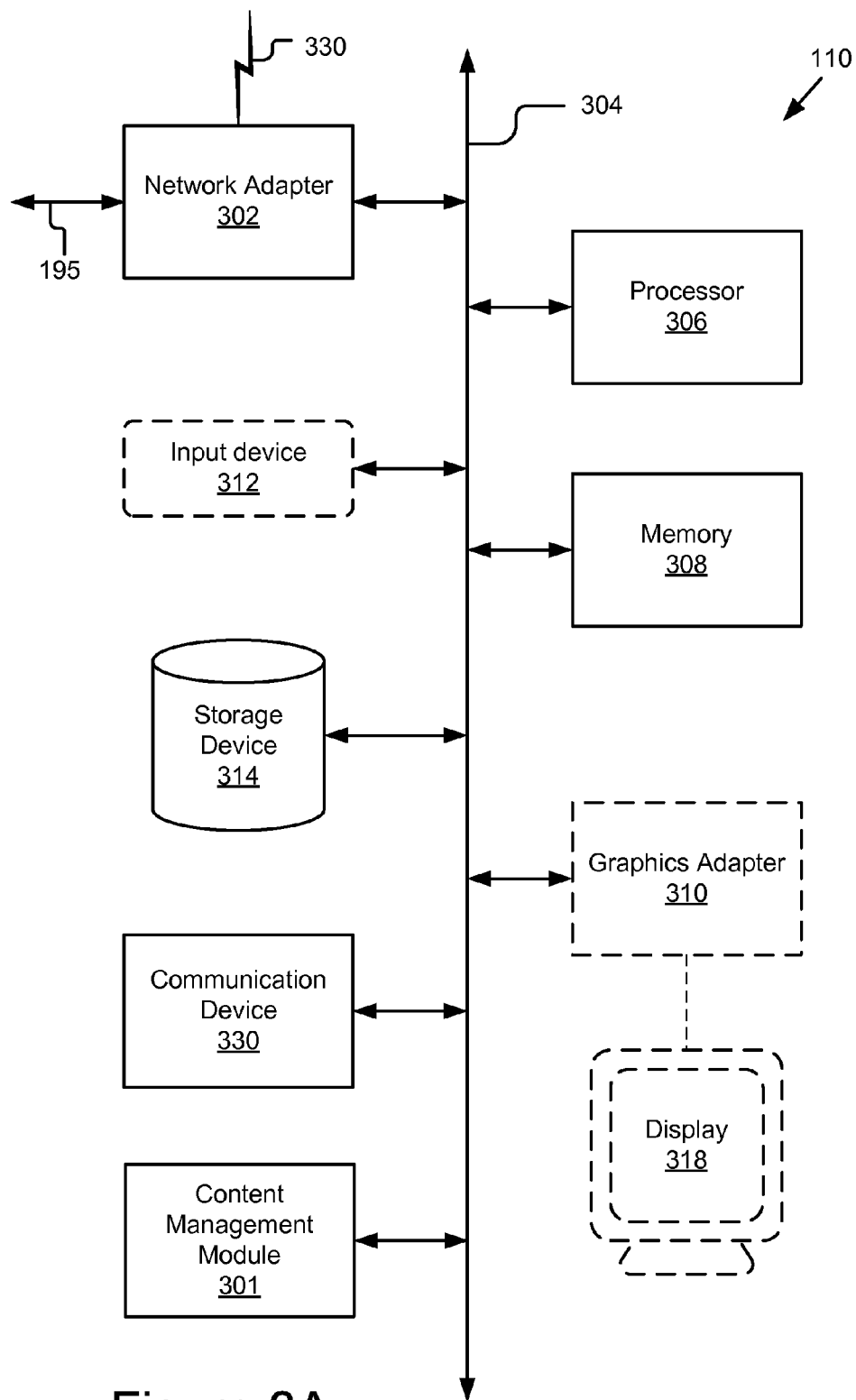
FIG. 3A is a block diagram illustrating one embodiment of a content management system.

FIG. 3A is a block diagram illustrating one embodiment of a content management system 110. As illustrated in FIG. 3A, the content management system 110 includes a network adapter 302 coupled to a bus 304. According to one embodiment, also coupled to the bus 304 are at least one processor 306, a memory 308, a graphics adapter 310, an input device 312, a storage device 314, a content management module 301 and a communication device 330. In one embodiment, the functionality of the bus 304 is provided by an interconnecting chipset. The content management system 110 also includes a display 318, which is coupled to the graphics adapter 310. The input device 312, the graphics adapter 310 and the display 318 are depicted using dashed lines to indicate that they are optional features of the content management system 110.

The network adapter 302 is an interface that couples the content management system 110 to a local or wide area network. For example, the network adapter 302 is a network controller that couples the content management system 110 to the network 150 via the signal line 195 for data communication between the content management system 110 and other components of the system 100. In one embodiment, the network adapter 302 is communicatively coupled to a wireless network (e.g., a wireless local area network) via a wireless channel 333.

The processor 306 is any general-purpose processor. The processor 306 comprises an arithmetic logic unit, a microprocessor, a general purpose controller or some other processor array to perform computations and provide electronic display signals to the display 318, if included. The processor 306 is coupled to the bus 304 for communication with the other components of the content management system 110. The processor 306 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3A, multiple processors may be included. The content management system 110 also includes an operating system executable by the processor 306 such as, but not limited to, WINDOWS®, Linux®, BSD®, or UNIX® based operating systems.

The memory 308 holds instructions and data used by the processor 306. The instructions and/or data comprise code for performing any and/or all of the techniques described herein. The memory 308 may be a dynamic random access memory (DRAM) device, a static random access memory (SRAM) device, flash memory or some other memory device known in the art. In one embodiment, the memory 308 also includes a non-volatile memory such as a hard disk drive or flash drive for storing log information on a more permanent basis. The memory 308 is coupled to the bus 304 for communication with the other components of the content management module 110. In one embodiment, the content management module 301 is stored in the memory 308 and executable by the processor 306.

The storage device 314 is any device capable of holding data, like a hard drive, compact disk read-only memory (CD-ROM), DVD, or a solid-state memory device. The storage device 314 is a non-volatile memory device or similar permanent storage device and media. The storage device 314 stores data and instructions for the processor 306 and comprises one or more devices including a hard disk drive, a floppy disk drive, a CD-ROM device, a DVD-ROM device, a DVD-RAM device, a DVD-RW device, a flash memory device, or some other mass storage device known in the art. In some embodiments, the storage device 314 includes instructions and/or data for maintaining metadata associated with video data, for modifying stored metadata or for retrieving stored video data or stored metadata associated with stored video data. For clarity, instructions and/or data stored by the storage device 314 are described herein as different functional "modules," where different modules are different instructions and/or data included in the storage device 314 that cause the described functionality when executed by the processor 306.

The input device 312 is any device for inputting data into the content management system 110. For example, the input device 312 is one of a mouse, track ball or other type of pointing device to input data to the content management system 110. In one embodiment, the input device 312 includes one or more of a keyboard (e.g., a QWERTY keyboard), a microphone, a web camera or similar audio or video capture device.

The graphics adapter 310 displays images and other information on the display 318. The display 318 is a conventional type such as a liquid crystal display (LCD) or any other similarly equipped display device, screen or monitor. The display 318 represents any device equipped to display electronic images and data as described herein. In one embodiment, display 318 is a touch-screen display that provides the functionality of the input device 312.

The communication device 330 transmits data from the content management system 110 to the network 150 and receives data from the network 150. The communication device 330 is coupled to the bus 304. In one embodiment, the communication device 330 also exchanges data with one or more of the analytics server 123, the data store 120, the cache 130, the third party video server 180, the third party ad server 190, and one or more of the ad servers 140 using communication channels other than the network 150.

In one embodiment, the communication device 330 includes a port for direct physical connection to the network 150 or to another communication channel. For example, the communication device 330 includes a USB, SD, CAT-5 or similar port for wired communication with the network 150. In another embodiment, the communication device 330 includes a wireless transceiver for exchanging data with the network 150 or with another communication channel, using one or more wireless communication methods, such as IEEE 802.11, IEEE 802.16, BLUETOOTH® or any other wireless communication method.

In yet another embodiment, the communication device 330 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication device 330 includes a wired port and a wireless transceiver. The communication device 330 also provides other conventional connections to the network 150 for distribution of files and/or media objects using standard network protocols such as TCP/IP, HTTP, HTTPS and SMTP as will be understood to those skilled in the art.

FIG. 3A further illustrates a content management module 301 communicating over the bus 304 with the other components of the content management system 110. The content management module 301 provides logic and instructions for storing video data from a publisher and providing the video data to other users. In one embodiment, the content management module 301 is implemented in hardware such as a field programmable gate array ("FPGA" if singular, or "FPGAs" if plural) as illustrated in FIG. 3A. In another embodiment, the content management module 301 includes software routines and instructions that are stored, for example, in the memory 308 and/or storage device 314 and executable by the processor 306 to cause the processor 306 to store video data from a publisher and provide the video data to other users. In either embodiment, the content management module 301 is adapted for cooperation and communication with the processor 306 and other components of the content management system 110. Details describing the functionality and components of the content management module 301 will be explained in further detail below with reference to FIG. 3B.

As is known in the art, the content management system 110 can have different and/or other components than those shown in FIG. 3A. In addition, the content management system 110 can lack certain illustrated components. In one embodiment, the content management system 110 lacks an input device 312, graphics adapter 310 and/or display 318. Moreover, the storage device 314 can be local and/or remote from the content management system 110 (such as embodied within a storage area network (SAN)).

As is known in the art, the content management system 110 is adapted to execute computer program modules for providing functionality described herein. As used herein, the term "module" refers to computer program logic utilized to provide the specified functionality. Thus, a module can be implemented in hardware, firmware and/or software. In one embodiment, program modules are stored on the storage device 314, loaded into the memory 308 and executed by the processor 306.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Content Management Module 301

Figure 3B:
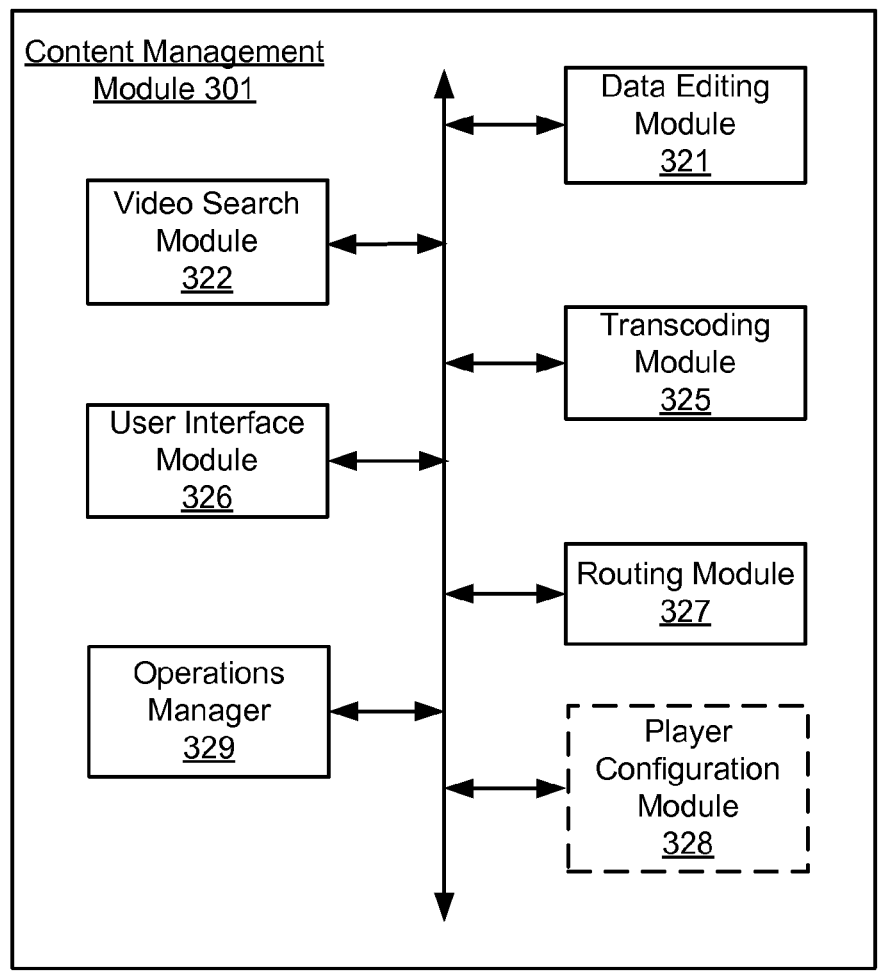
FIG. 3B is a block diagram illustrating one embodiment of a content management module.

Turning now to the content management module 301, FIG. 3B is a block diagram illustrating one embodiment of the content management module 301. In the embodiment depicted by FIG. 3B, the content management module 301 includes a data editing module 321, a video search module 322, a transcoding module 325, a user interface module 326, a routing module 327, a player configuration module 328 and an operations manager 329. In other embodiments, the content management module 301 includes different and/or additional modules than the ones depicted in FIG. 3B.

In one embodiment, the modules are implemented using instructions and/or data included in the storage device 314. In another embodiment, the modules are implemented using one or more hardware devices configured to provide the functionality further described below. For example, the modules are implemented using one or more application specific integrated circuits (ASICs) and/or one or more FPGAs coupled to the bus 304 and configured to provide the functionality of the modules further described below.

The data editing module 321 includes software and routines executable by the processor 306 for modifying metadata and/or video data stored in the data store 120. In one embodiment, the data editing module 321 receives data from a user via the user interface module 326 and uses the received data to generate or modify metadata that is stored by the data store 120. Additionally, the data editing module 321 generates or modifies playlists including a sequence of video data based on data received from a user device 160 via the user interface module 326. For example, the user interface module 326 receives data for modifying stored metadata associated with video data or identifying metadata for association with video data from a user device 160 via the network 150 and the bus 304, and the data editing module 321 then modifies metadata associated with the video data using the received data or stores the received metadata and an association between the received metadata and video data in the data store 120 as further described below.

In one embodiment, the data editing module 321 generates an instruction identifying the metadata to be modified and the modification to the metadata or identifying metadata and video data associated with the metadata. The generated instruction is then transmitted to the data store 120 by the communication device 330 to modify the metadata. Similarly, the data editing module 321 generates an instruction modifying a playlist, identifying modifications to the video data included in the playlist or identifying one or more attributes associated with the playlist to be modified. The generated instruction is transmitted to the data store 120 via the bus 304, the communication device 330 and the network 150.

The video search module 322 includes software and routines executable by the processor 306 for generating data or instructions for retrieving video data from the data store 120 based on received input, such as search terms. The video search module 322 searches the data store 120 for metadata matching, or similar to, search terms received from the communication device 330 and/or from the user interface module 326. Hence, the video search module 322 allows users to more easily retrieve stored video data using metadata associated with the stored video data. For example, the video search module 322 accesses the data store 120 via the network 150, the communication device 330 and the bus 304 to identify video data associated with metadata matching, or similar to, search terms received from the communication device 330 and/or from the user interface module 326.

Rather than require navigation through a directory structure to retrieve stored video data, like conventional data retrieval, the video search module 322 searches metadata associated with stored video data to identify and retrieve stored video data. In one embodiment, the video search module 322 also receives data limiting the metadata to which the search terms are compared. For example, the video search module 322 receives input limiting comparison of search terms to metadata specifying video title and not to other metadata. The video search module 322 also receives data from the data store 120 describing stored video data associated with metadata matching, or similar to, the search terms. The video search module 322 communicates the description of the stored video data to the user interface module 326 via the bus 304, and the user interface module 326 generates graphical data for providing a user interface to present the video data from the data store 120 to a user.

The transcoding module 325 includes software and routines executable by the processor 306 for generating a copy of the video data encoded in a different format than the video data's original format. The transcoding module 325 includes one or more codecs for generating differently encoded copies of the video data. For example, the transcoding module 325 includes multiple video codecs, such as H.262/MPEG-2 Part 2 codecs, H.264/MPEG-4 Advanced Video Coding codecs, MPEG-4 Part 2 codecs, VP8 codecs or other video codecs. By storing different video codecs, the transcoding module 325 enables generation of a compressed version of stored video data by encoding the video data with one or more of the stored video codecs. The differently-encoded copy of the video data is communicated to the data store 120 for storage and association with the original video data.

In one embodiment, the transcoding module 325 automatically encodes video data received by the content management system 110 using one or more predetermined codecs to generate one or more compressed versions of the video data, which are stored in the data store 120 along with the original video data. For example, the transcoding module 325 automatically encodes video data using one or more commonly-used codecs, such as one or more H.264/MPEG-4 Advanced Video Coding codecs or one or more VP8 codecs. This simplifies distribution of the video data to a destination site 170 by automatically generating compressed versions of the video data using codecs most commonly used by the destination site 170. In one embodiment, input received by the user interface module 326 allows a user to specify one or more codecs that are automatically applied to video data. For example, a user specifies a list of codecs to produce compressed video data compatible with a user-desired destination site 170, allowing the content management system 110 to automatically generate video data compatible with the user-desired destination site 170.

The transcoding module 325 may also receive input via the user interface module 326, allowing manual identification of a codec and encode video data using the identified codec. Additionally, a user may communicate one or more codecs to the content management system 110 via the network 150 and the transcoding module 325 stores the user-supplied codecs for subsequent use. Additionally, a destination site 170 may communicate codecs to the transcoding module 325 via the network 150, allowing the transcoding module 325 to dynamically modify the codecs used. The transcoding module 325 may also modify the one or more codecs automatically applied to video data responsive to data from the destination site 170 and/or from a user device 160, enabling dynamic modification of video encoding as different and/or additional codecs become more commonly used.

The user interface module 326 includes software and routines executable by the processor 306 for generating graphical data to provide one or more user interfaces for receiving data from a user and/or presenting video data and/or metadata associated with video data to a user. For example, the user interface module 326 includes instructions that, when executed by a processor 306, generate user interfaces for displaying metadata associated with video data and/or modifying metadata associated with video data. In one embodiment, data stored in the user interface module 326 is communicated to a user device 160 via the communication device 330 and the network 150, and a processor included in the user device 160 generates a user interface by executing the instructions provided by the user interface module 326.

In one embodiment, the user interface module 326 generates graphical data for providing a user interface to display metadata that is associated with video data and stored in the data store 120 and receives modification to the stored metadata. In another embodiment, the user interface module 326 generates graphical data for providing a user interface identifying stored video data associated with a publisher from the data store 120, thus expediting the publisher's review of previously stored video data. In yet another embodiment, the user interface module 326 generates graphical data for providing a user interface for receiving input from a publisher to upload video data from a user device 160 to the data store 120 and facilitating publication of the video data by the publisher using the content management system 110. In yet another embodiment, the user interface module 326 generates graphical data for providing a user interface allowing a publisher to customize a media player 115 for video presentation.

The routing module 327 includes software and routines executable by the processor 306 for identifying a destination for data received by the content management system 110 or processed by the content management system 110. After the routing module 327 determines the destination, the communication device 330 transmits the data to the determined destination using the bus 304. In one embodiment, the routing module 327 includes a routing table associating destinations with different types of data and/or with different commands. For example, the routing module 327 determines that editing commands from the data editing module 321 are routed to the data store 120 and determines that search commands from the video search module 322 are routed to the data store 120. As additional examples, the routing module 327 determines that data from the user interface module 326 is directed to a user device 160 or determines that website usage data or video access data is transmitted to the analytics server 123.

The player configuration module 328 includes software and routines executable by the processor 306 for generating configuration settings for the media player 115. In one embodiment, the player configuration module 328 generates the configuration settings based at least in part on a publisher's customization to the media player 115. For example, the player configuration module 328 generates a configuration setting based any customized function (e.g., age gating, questions about ad tailoring, adding domain restrictions, adding geographic restrictions, etc.) added to the media player 115 by the publisher. The custom functions can be added to the media player, for example, by modifying the metadata (e.g., extensible metadata) of the media player 115 or via the application programming interfaces ("APIs") of the media player 115. The player configuration module 328 is depicted with a dashed line to indicate that it is an optional feature of the content management module 301. In one embodiment, the player configuration module 328 is comprised within one or more of the third party video server 180, the content management module 301 and the destination site 170.

In one embodiment, a publisher uploads a video to the content management system 110 and/or customizes a media player 115 for presenting the video using the player configuration module 328. For example, a publisher adds one or more features to the media player 115 by submitting a description of any customizations to the player configuration module 328 via a user interface. Descriptions of customizations include, for example, descriptions of age gating, ad tailoring queries, adding domain restrictions, adding geographic restrictions, etc.

The player configuration module 328 converts the publisher's customization of the media player 115 into a set of configuration settings and stores the configuration settings as a portion of the customized extensible metadata 294 in the storage device 314. For example, the player configuration module 328 stores a blacklist identifying domains or geographic regions in which the media player 115 is unable to present video data. Alternatively, the player configuration module 328 stores a whitelist identifying domains or geographic regions in which the media player 115 is able to present video data. In other embodiments, the player configuration module 328 includes both a whitelist and a blacklist of domains or geographic regions for limiting presentation of video data by the media player 115. The customized extensible metadata 294 includes the blacklist and the whitelist.

In one embodiment, the player configuration module 328 sends the customized extensible metadata 294 to a user device 160 so that the media player 115 launched in the user device 160 is configured according to the customized extensible metadata 294 to implement the features added by the publisher. In another embodiment, the player configuration module 328 stores the customized extensible metadata 294 in the storage device 314 or the data store 120.

The operations manager 329 includes software and routines executable by the processor 306 for generating modifications to metadata stored in the data store 120 and scheduling modification of the stored metadata. Additionally, the operations manager 329 determines when data stored by the data store 120 is changed and notifies the content management system 110 when stored data has been changed using the communication device 330 and/or the network 150 or any other communicative connection to the data store 120. In one embodiment, the operations manager 329 maintains one or more queues for scheduling modification of stored metadata or communicating new metadata to the data store 120. The operations manager 329 also communicates changes of stored metadata to a destination site 170 via the communication device 330 and the network 150, allowing the destination site 170 to receive the most current metadata. In one embodiment, the operations manager 329 generates a queue or other schedule specifying the timing of communication of metadata to a destination site 170.

Analytics Server 123

Figure 4:
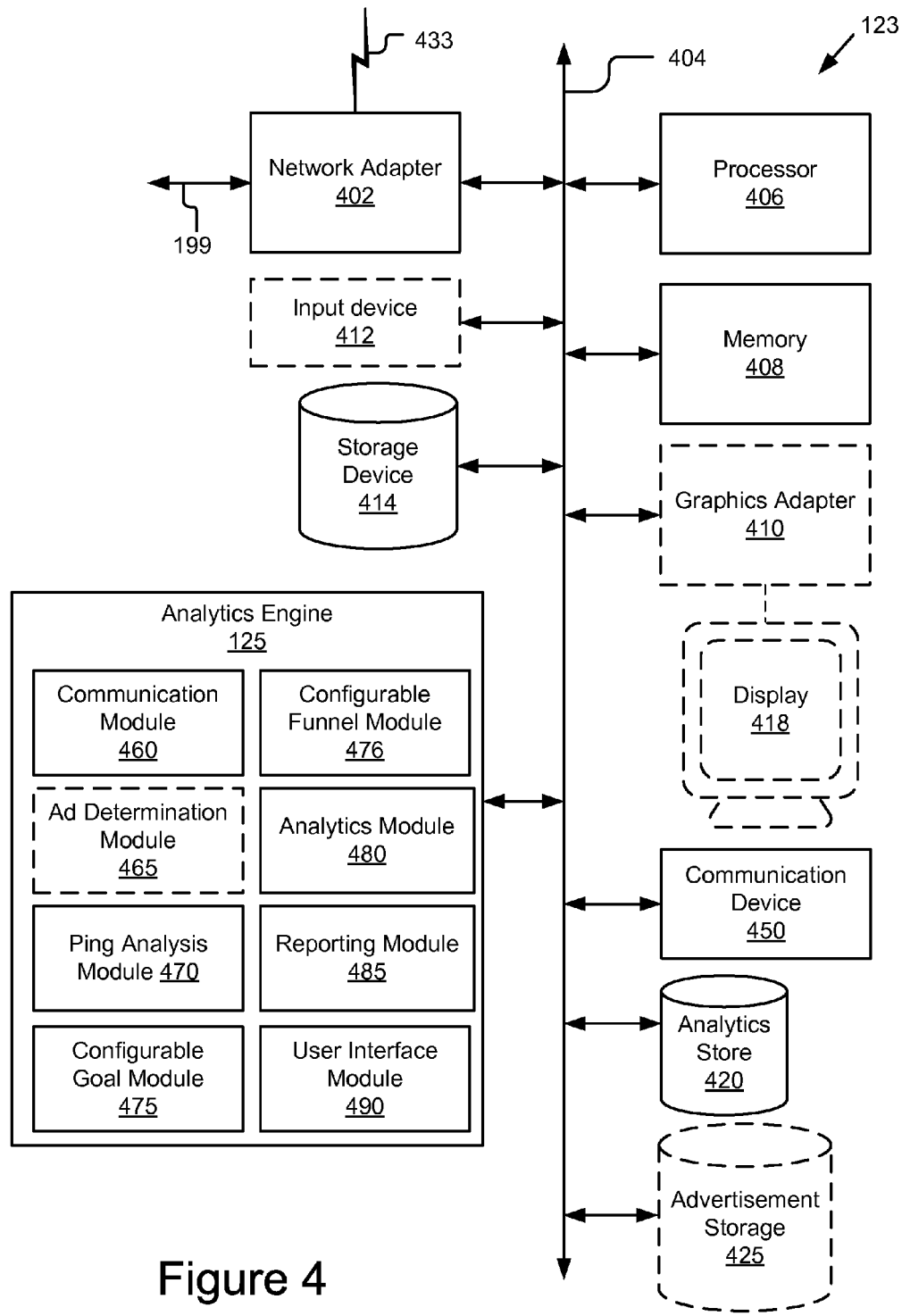
FIG. 4 is a block diagram illustrating one embodiment of an analytics server.

Referring now to FIG. 4, the analytics server 123 and analytics engine 125 are shown in more detail. FIG. 4 is a block diagram illustrating one embodiment of the analytics server 123. As illustrated in FIG. 4, the analytics server 123 includes a network adapter 402 coupled to a bus 404. According to one embodiment, also coupled to the bus 404 are at least one processor 406, a memory 408, a graphics adapter 410, an input device 412, a storage device 414, an analytics engine 125, an analytics store 420, an advertisement storage ("ad storage") 425 and a communication device 450. In one embodiment, the functionality of the bus 404 is provided by an interconnecting chipset. The analytics server 123 also includes a display 418, which is coupled to the graphics adapter 410. The input device 412, the graphics adapter 410, the display 418 and the ad storage 425 are depicted using dashed lines to indicate that they are optional features of the analytics server 123. Persons of ordinary skill in the art will recognize that the analytics server 123 may have different and/or other components than those shown in FIG. 4. In addition, the storage device 414 can be local and/or remote from the analytics server 123 (such as embodied within a storage area network (SAN)).

As is known in the art, the analytics server 123 is adapted to execute computer program modules for providing functionality described herein. As used herein, the term "module" refers to computer program logic utilized to provide the specified functionality. Thus, a module can be implemented in hardware, firmware and/or software. In one embodiment, program modules are stored on the storage device, loaded into the memory and executed by the processor 406.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The network adapter 402 is an interface that couples the analytics server 123 to a local or wide area network. For example, the network adapter 402 is a network controller that couples the analytics server 123 to the network 150 via the signal line 199 for data communication between the analytics server 123 and other components of the system 100. In one embodiment, the network adapter 402 is communicatively coupled to a wireless network (e.g., a wireless local area network) via a wireless channel 433.

The processor 406 is any general-purpose processor. The processor 406 comprises an arithmetic logic unit, a microprocessor, a general purpose controller or some other processor array to perform computations and provide electronic display signals to the display 418. The processor 406 is coupled to the bus 404 for communication with the other components of the analytics server 123. The processor 406 processes data signals and may comprise various computing architectures including a complex instruction set computer (CISC) architecture, a reduced instruction set computer (RISC) architecture, or an architecture implementing a combination of instruction sets. Although only a single processor is shown in FIG. 4, multiple processors may be included. The analytics server 123 also includes an operating system executable by the processor 406 such as, but not limited to, WINDOWS®, Linux®, BSD®, or UNIX® based operating systems.

The memory 408 holds instructions and data used by the processor 406. The instructions and/or data comprise code for performing any and/or all of the techniques described herein. The memory 408 may be a dynamic random access memory (DRAM) device, a static random access memory (SRAM) device, flash memory or some other memory device known in the art. In one embodiment, the memory 408 also includes a non-volatile memory such as a hard disk drive or flash drive for storing information on a more permanent basis. The memory 408 is coupled to the bus 404 for communication with the other components of the analytics server 123. In one embodiment, the analytics engine 125 is stored in the memory 408 and executable by the processor 406.

The storage device 414 is any device capable of holding data, like a hard drive, compact disk read-only memory (CD-ROM), DVD, or a solid-state memory device. The storage device 414 is a non-volatile memory device or similar permanent storage device and media. The storage device 414 stores data and instructions for the processor 406 and comprises one or more devices including a hard disk drive, a floppy disk drive, a CD-ROM device, a DVD-ROM device, a DVD-RAM device, a DVD-RW device, a flash memory device, or some other mass storage device known in the art. In some embodiments, the storage device 414 includes instructions and/or data for maintaining metadata associated with video data, for modifying stored metadata or for retrieving stored video data or stored metadata associated with stored video data. For clarity, instructions and/or data stored by the storage device 414 are described herein as different functional "modules," where different modules are different instructions and/or data included in the storage device 414 that cause the described functionality when executed by the processor 406.

The input device 412 is any device to input data to the analytics server 123. For example, the input device 412 is one of a mouse, track ball or other type of pointing device to input data to the analytics server 123. In one embodiment, the input device 412 includes one or more of a keyboard (e.g., a QWERTY keyboard), a microphone, a web camera or similar audio or video capture device.

The graphics adapter 410 displays images and other information on the display 418. The display 418 is a conventional type such as a liquid crystal display (LCD) or any other similarly equipped display device, screen or monitor. The display 418 represents any device equipped to display electronic images and data as described herein. In one embodiment, display 418 is a touch-screen display that provides the functionality of the input device 412.

The communication device 450 transmits data from the analytics server 123 to the network 150 and receives data from the network 150. For example, the communication device 450 communicates via the network adapter 402 to transmit data to, and receive data from, the network 150. The communication device 450 is coupled to the bus 404. In one embodiment, the communication device 450 also exchanges data among one or more of the content management system 110, the data store 120, the cache 130, the third party video server 180, the third party ad server 190, and one or more of the ad servers 140 using communication channels other than the network 150.

In one embodiment, the communication device 450 includes a port for direct physical connection to the network 150 or to another communication channel. For example, the communication device 450 includes a USB, SD, CAT-5 or similar port for wired communication with the network 150. In another embodiment, the communication device 450 includes a wireless transceiver for exchanging data with the network 150, or with another communication channel, using one or more wireless communication methods, such as IEEE 802.11, IEEE 802.16, BLUETOOTH® or another suitable wireless communication method.

In yet another embodiment, the communication device 450 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication device 450 includes a wired port and a wireless transceiver. The communication device 450 also provides other conventional connections to the network 150 for distribution of files and/or media objects using standard network protocols such as TCP/IP, HTTP, HTTPS and SMTP as will be understood to those skilled in the art.

The analytics engine 125 includes software and routines executable by the processor 406 for generating video funnel analytics from media player state data received from the media player 115. The analytics engine 125 is communicatively coupled to the bus 404 for communication with other components of the analytics server 123. In one embodiment, the analytics engine 125 provides logic and instructions for performing one or more of the following functions: receiving website usage data; generating web analytics data from website usage data; receiving media player state data; associating media player state data with the web analytics data and/or website usage data; generating video analytics data including video funnel analytics and metrics from the media player state data and the web analytics data and/or website usage data; and storing the media player state data, the metrics, the video analytics data, the video funnel analytics, the website usage data and the web analytics data.

In one embodiment, the analytics engine 125 is implemented in hardware (e.g., in an FPGA) as illustrated in FIG. 4. In another embodiment, the analytics engine 125 includes software routines and instructions that are stored, for example, in the memory 408 and/or storage device 414 and executable by the processor 406 to cause the processor 406 to implement functionalities described herein.

In the depicted embodiment as shown in FIG. 4, the analytics engine 125 includes a communication module 460, an advertisement determination module ("ad determination module") 465, a ping analysis module 470, a configurable goal module 475, a configurable funnel module 476, an analytics module 480, a reporting module 485, and a user interface module 490, which are communicatively coupled to one another. The ad determination module 465 is depicted using a dashed line to indicate that it is an optional feature of the analytics engine 125.

The communication module 460 includes software and routines executable by the processor 406 to handle communication between the analytics engine 125 and other components of the system 100. In one embodiment, the communication module 460 receives pings from the media player 115 via the network 150 and the communication device 450. In another embodiment, the communication module 460 receives website usage data from webpages provided by one of the destination site 170, the third party video server 180 and the content management system 110 via the network 150 and the communication device 450.

In one embodiment, the communication module 460 sends a report generated by the reporting module 485 to a publisher (e.g., via the third party video server 180). In another embodiment, the communication module 460 sends a data stream for an ad to the media player 115 embedded in a webpage on a user device 160. The ad determination module 465 includes software and routines executable by the processor 406 to determine an ad to be played on the media player 115. For example, the ad determination module 465 parses metadata associated with a video (e.g., a keyword describing the video) and selects an ad that matches the metadata of the video from the advertisement storage 425. In one embodiment, the ad determination module 465 implements some or all of the functionalities provided by the ad server 140 or the third party ad server 190.

In one embodiment, an ad associated with a video is pre-determined by a publisher when publishing the video. The ad determination module 465 retrieves the pre-determined ad for the video from the ad storage 425. In another embodiment, the ad determination module 465 retrieves video analytics data for a video from the analytics store 420 and determines an ad for the video based at least in part on the analytics data. For example, if the video analytics data shows that 60% of the video views are from users interested in jogging, the ad determination module 465 selects an ad related to a sport product (e.g., running shoes) for the video. In yet another embodiment, the ad determination module 465 determines temporal location and placement of an ad for a video. For example, the ad determination module 465 determines to play the ad before the viewing of the video, in the middle of the viewing of the video or after the viewing of the video. In yet another embodiment, the main video to be played by a media player 115 is a video advertisement stored in ad storage 425, and the ad determination module 465 retrieves the video advertisement from the ad storage 425 based at least in part on a video ID and a video version provided by the media player 115 in a request for the video advertisement.

The ping analysis module 470 includes software and routines executable by the processor 406 for analyzing media player state data. The ping analysis module 470 receives media player state data in the form of a ping from the media player 115 via the communication module 460. In one embodiment, the ping analysis 470 module parses the media player state data, sends the parsed media player state data to the configurable funnel module to be associated with one or more steps of a video funnel, and stores the media player state data in the analytics store 420. For example, the ping analysis module 470 is a parser that parses a ping received as an http "get" request from the media player 115 for a video being played in a media player 115. The parser parses the "get" request to retrieve a video ID, a video version, an embedded URL, and an event included in the request.

The ping analysis module 470 also determines whether the event included in the ping is a custom event. In one embodiment, to determine whether the event is a custom event, the ping analysis module 470 checks the ping for an identifier identifying the event as a custom event. For example, a publisher defines a video-related goal and a video funnel for the video-related goal using the graphical user interface 1100, and includes in that definition a video ID and one or more custom events for a particular video. Upon receiving a ping from a media player 115 playing that particular video, the ping analysis module 470 parses the ping to extract at least the event, an identifier identifying the event as custom and the video ID.

In another embodiment, a list of customizations made to a media player 115 by a publisher along with a media player identifier is provided by the publisher to the analytics engine 125 via the communication module 460 and stored in the analytics store 420. Upon receiving a ping, the ping analysis module 470 of the media player 115 parses the ping to extract the event, the media player identifier identifying the media player 115, and the video ID included in the ping. The ping analysis module 470 then compares the event to the list of customizations made to the media player 115 using the media player identifier and the video ID to determine whether the event matches a customization included in the list of customizations. If a match exists, then the event is identified by the ping analysis module 470 as being a custom event. In yet another embodiment, the ping analysis module 470 maintains a second list of non-custom events and determines an event to be a custom event if the event is not included in the second list.

The user interface module 490 includes software and routines executable by the processor 406 to generate graphical data for one or more user interfaces. For example, the user interface module 490 includes instructions that, when executed by a processor 490, generate the graphical user interface 1100 depicted in FIGS. 12A and 12B. The one or more user interfaces capture video-related goal data from a publisher and/or present analytics reports including at least goal-based video analytics to the publisher. In one embodiment, the user interface module 490 communicates instructions based at least in part on video-related goal data stored in the analytics store 420 and user interface instructions stored in the user interface module to a user device 160 via the communication device 450 and the network 150, and a processor included in the user device 160 generates a user interface by executing the instructions provided by the user interface module 490. In another embodiment, the user interface module 490 generates video funnel-based graphical data for a user interface. In yet another embodiment, the user interface module 490 receives analytics reports from the reporting module 485 and instructs the analytics server 123 to transmit the analytics reports to a user device 160 for display to a publisher.

The graphical user interface 1100, as depicted in FIGS. 12A and 12B, includes a goal name text field 1110, a goal activation toggle 1120, a goal position selector 1130, a goal type selector 1140, goal details fields 1150 for information related to a selected goal type and video funnel fields 1170. In the depicted embodiment, to define a video-related goal, a publisher enters a name for the goal in the goal name text field 1110 and selects a purpose for the video-related goal using the goal type selector 1140. The goal type selector 1140 presents the publisher with a variety of preconfigured video-related goal types as well as an option to select and configure a custom video-related goal type. The publisher selects a goal type using the goal type selector 1140 and enters one or more parameters associated with the goal type in the goal details fields 1150. For example, selecting "URL Destination with Video View" with the goal type selector 1140 allows the publisher to define a webpage destination as a goal, where the webpage destination is a webpage that includes a media player 115 designated to play a particular video or series of videos. The publisher then enters a definition for the goal's video funnel 1170 by defining a series of steps necessary to convert the video-related goal.

The goal activation toggle 1120 tells the analytics engine 125 whether or not to track and/or report the video-related goal. For example, if for a period of time a publisher wishes to deactivate the tracking and/or reporting of the video-related goal, the publisher can access the video-related goal via the graphical user interface 1100 and toggle the goal activation toggle 1120 to "off." Then, at a later time, the publisher can reactivate tracking and/or reporting of the video-related goal by the analytics engine 125 by toggling the goal activation toggle 1120 back to "on."

The goal position selector 1130 selects which set of goals the video-related goal being configured will be associated with, and assigns a unique number to the video-related goal within the selected set. In one embodiment, the configurable goal module 475 receives definitions for multiple sets of goals to categorize different types of video-related goals into different sets, and stores the set definitions in the analytics store 420. For example, video-related goals related to video views, registrations, and monetization are stored as separate sets in the analytics store 420. In one embodiment, analytics reports related to each of the sets are generated by the reporting module 485 of the analytics module 480 to report comparative video-related goal satisfaction results between the sets and between the goals of each of the sets.

The goal details fields 1150 allow a user (e.g., a publisher) to enter video-related goal criterion which are used by the analytics engine 125 in association with media player state data and/or website usage data to determine the number of times a video-related goal has been satisfied (also referred to herein as the number of "video-related goal conversions"). In one embodiment, where the video-related goal type is to track visits to a URL destination that include a video view, the goal details fields 1150 include a match type selector 1152, a goal URL field 1154, a case sensitive checkbox 1156, and a goal value 1158. However, depending on the video-related goal type, the associated goal details fields 1150 can include different or customized inputs affiliated with the selected video-related goal type. For example, for a custom video-related goal type, a publisher can define customized input fields to create a custom video-related goal definition. For example, a publisher can define a video-related goal that seeks to achieve a certain viewing age for a particular video or video series played by a media player 115 customized to track the viewing age of viewers. In this definition, in addition to adding at least a video ID(s) field, the publisher creates a custom input to define the desired viewing age as being 20 years old.

The match type selector 1152 is used to select whether satisfaction of the video-related goal should be limited to video views that occur on a webpage with an address that exactly matches the webpage address entered in the goal URL field 1154. The goal URL field 1154 is used to identify whether the webpage address entered matches the letter case of the address of the visited webpage by checking the case sensitive checkbox 1156.

The goal value field 1158 is used to assign a goal value to the video-related goal. A goal value reflects the revenue that would be realized from a video-related goal conversion. For example, the analytics engine 125 generates a report showing the monetary value produced by video-related goal conversions, which is derived by multiplying the number of video-related goal conversions by the value included in the goal value field 1158. From the amount entered in the goal value field 1158, the analytics engine 125 can calculate various metrics such as return on investment and average score, which reflect the monetary effect of the video being included on the webpage. A goal's value can be, for example, determined by a royalty amount associated with the video(s) being played, or an amount of ad revenue associated with the video(s) being played.

The video funnel 1170 is a series of linear steps 1175 (also referred to individually and collectively as 1175) that reflect a path that is taken in order to convert the video-related goal. For example, the video funnel 1170 represents the navigational flow of a viewer's video consumption while navigating through a website or a plurality of websites. In another example, the video funnel 1170 represents the navigation flow of a customer's path through an e-commerce website, where the customer accesses a webpage for a particular product or service, watches a video for that product or service and elects to purchase that product or service.

In one embodiment of the video funnel 1170, all of the steps 1175 are required to occur in order to convert the video-related goal. In another embodiment, one or more initial or intermediate steps may be designated as optional using an optional step check box 1190, and the non-occurrence of the step does not prevent conversion of the video-related goal. In yet another embodiment, the video funnel 1170 may include a minimum of two steps, with the first step being optional, and a maximum of any number of steps.

In the depicted embodiment, two types of steps are depicted—the first being those related to a user's interact with a webpage (e.g., step 1), and the second being those related to a user's interaction with a media player 115 (e.g., step 2). While only one step related to a user's interaction with a media player 115 is included in the embodiment of FIG. 12B, any combination of the first and second types of steps may be included, along with other types of steps required to satisfy a video-related goal.

In the depicted embodiment, all steps 1175 regardless of type include a target field 1180 and a descriptor field 1185. Additionally, steps related to a user's interaction with a media player 115 include a video ID(s) field 1160. A user (e.g., a publisher) enters one or more video IDs of the videos associated with the step in a video ID(s) field 1160. In one embodiment, the one or more video IDs input into video ID(s) field 1160 for a particular step correspond with one or more video ID(s) included in media player state data pinged by a media player 115 to the analytics server 123 so the one or more video ID(s) can uniquely identify each video viewed using the media player 115. The analytics engine 125 then, for example, generates a report showing the number of visits to the URL designation that included a video view occurring within a specified timeframe using the information input into goal details fields 1150 and media player state data received from media players 115 that played the video data.

In one embodiment, the video ID is a unique character string generated to identify a particular video. However, other unique identifiers may be used in the place of a video ID to associate a video funnel and/or video-related goal with media player state data received from a media player 115. For example, URLs unique to the one or more videos being played may be used.

In one example of the depicted embodiment: in step 1, a user enters a URL of an entry page of a destination site 170 into the target field 1180 and a description in the descriptor field 1185; in step 2, a user enters an event or a series of events into target field 1180 (which can be a multiple entry field), a description of the video event in the descriptor field 1185, and relevant identifiers such as video IDs into the video ID(s) field 1160; in step 3, a user enters a URL of purchase click associated with the purchase of a product in target field 1180 and a description of the purchase click in the descriptor field 1185; and in step N, the user enters a URL of a purchase confirmation page in target field 1180 and a description of the purchase confirmation page in descriptor field 1185. In another embodiment, one or more of the steps 1175 is itself a video-related goal defined via a graphical user interface 1100 or a graphical user interface similar thereto. In this other embodiment, the target field 1180 includes an input selector such as a drop down menu, allowing a user to select a previously defined video-related goal or functionality to allow a user to define a video-related goal at the time of selection.

The configurable goal module 475 includes software and routines executable by the processor 406 for receiving video-related goal definitions from the interface generated on the user device 160, associating the video-related goal definitions with other information, and storing the video-related goal definitions in the analytics store 420. In one embodiment the configurable goal module 475 retrieves website usage data and parsed media player state data from the analytics store 420. In another embodiment, the configurable goal module 475 module receives website usage data directly from the communication module 460 and media player state data directly from the ping analysis module 470 after it has been parsed.

The configurable funnel module 476 includes software and routines executable by the processor 406 for receiving video funnel definitions from the interface generated on the user device 160, associating the video funnel definitions with other information such as website usage data and media player state data and storing the video funnel definitions in the analytics store 420. In one embodiment, the configurable funnel module 476 associates one or more steps (e.g., intermediate goals) of a video funnel with media player state data received from a media player 115 and parsed by the ping analysis module 470. For example, the configurable funnel module 476 uses a unique identifier, such as a video ID or a URL included in a definition of a video funnel, to associate the step with media player state data received from the media player 115 for a video viewed using the media player 115. In an embodiment where multiple videos are being viewed in series, each ping sent by the media player 115 includes a unique identifier, such as a video ID, for the event included in the ping so the configurable funnel module 476 can associate the event with the relevant step of the video funnel. In one embodiment the configurable funnel module 476 and the configurable goal module 475 retrieve media player state data from the analytics store 420 after it has been parsed and stored by the ping analysis module 470.

The media player state data include events/non-events required to occur in order to establish satisfaction of one or more steps of the video funnel. For example, the publisher of the video defines a video-related goal seeking to increase the number of complete views of a particular video. In doing so, the publisher defines a configurable video funnel definition for the video-related goal including a step requiring playback of the video begin, a step requiring at least 75% of the video be viewed, and a step requiring playback of the video end. During viewing of the video by viewers, the media player 115 sends media player state data, i.e., pings, indicating playback of the video has begun, a series of pings indicating 25%, 50%, 75%, and a 100% of the video has been played back, and pings indicating playback of the video has ended. Next, the configurable funnel module 476 associates the pings with the steps of a video funnel and the analytics module 480 analyzes the associated pings to determine that for each viewing session, pings exist satisfying the requirements of each step of the video funnel, i.e., indicating that playback started (e.g. to ensure that the video has not simply been queued up to the 75% point), that at least 75% has been played back, and that playback of the video has ended (e.g., to ensure that the video is not simply in a paused state). The analytics module also analyses the pings to ensure that no fast forward or skip events were received (e.g., to verify the video was played continuously).

In another example, a publisher defines a video-related goal to track how many viewers view a series of videos available for viewing in a media player 115. The video-related goal includes an associated video funnel stored in the analytics store 420 that has steps directed to the viewing of each of the videos making up the series. In this example, the media player 115 sends a series of pings including events reflecting the viewing of each of the videos (as identified by video ID, for example) and the configurable funnel module 476 associates the pings with the steps of the video funnel and stores the association in the analytics store for later use by the analytics module 480.

In another embodiment, the configurable funnel module 476 associates one or more steps of a video funnel with website usage data received by the communication module 460. For example, one step of the video funnel is an intermediate goal of having a customer click a purchase link on a webpage that includes a video of the product to be purchased. The configurable funnel module associates website usage data received for the webpage to determine whether a customer clicked on the purchase link and satisfied the step. In one embodiment, the configurable funnel module 476 retrieves website usage data from the analytics store 420 after it has been received and stored by the communication module 460. In another embodiment, the configurable funnel module 476 receives website usage data directly from the communication module 460.

In another embodiment, the configurable funnel module 476 associates website usage data and media player state data with a video funnel of a video-related goal using a unique identifier. A unique identifier can be a media player session identifier, a browser session identifier corresponding to the webpage collecting the website usage data, or any other identifier related to both the website usage data and media player state data. For example, the web browser launched on the user device 160 collects a media player session identifier from a media player 115 or a cookie associated therewith and sends it with website usage data and/or a browser session identifier to the configurable funnel module 476 via the network 150. In another example, the media player 115 launched on the user device 160 collects a browser session identifier from the web browser or a cookie associated therewith and sends it with media player media player state data and/or a media player session identifier to the configurable funnel module 476 via the network 150. Session identifiers and cookies are further described below with reference to FIG. 11.

In another example of this embodiment, a publisher submits a video-related goal including a video funnel to the analytics engine 125 for a video. On a user device 160, a viewer clicks a video thumbnail, included in the webpage, of a video the viewer wishes to view. The webpage includes JavaScript code provided by the analytics server 123 that captures and transmits website usage data related to the click of the video to the analytics engine 125. Clicking the video thumbnail instructs a media player 115 included on the webpage to begin playing of an associated video and, during playback of the video, the media player 115 captures and pings media player state data related to the viewing of the video to the analytics engine 125. The configurable goal module 475 and the configurable funnel module 476 associate the website usage data and the media player state data after it has been received from the user device 160 with the video-related goal and the video funnel, respectively, using identifying information (e.g., a session identifier, a video ID of the video being viewed, a URL, etc.).

In yet another embodiment, the configurable funnel module 476 associates a video funnel for a video-related goal stored in the analytics store 420 with media player state data received for different videos from a plurality of media players (e.g., a first media player 115 and a second media player 115) using identifiers. The identifiers can be a common URL destination for each of the media players 115, video IDs for videos being viewed by the first and second media players 115, session identifiers or any other identifiers that relate the video funnel of the video-related goal and the videos being viewed. For example, a viewer accesses a webpage on a user device 160 that includes two media players 115, each presenting a unique video. The viewer views both videos and the media players 115 ping media player state data including a video ID for each video and events associated with the viewing of the videos to the analytics server 123. The configurable funnel module 476 of the analytics engine 125 associates the media player stated data from each media player 115 with a stored video funnel of a video-related goal (such as a goal customized to track the number of webpage visits that include funnel steps of viewing the first video and then the second video) using identifying information such as the video IDs of the viewed videos and a browser session identifier.

In another example, a viewer accesses successive webpages on a user device 160 that each includes a media player 115 presenting a video. During the viewing of the video on each of the successive webpages, the media players 115 ping media player state data including a video ID for each video played and events associated with the viewing of the videos to the analytics server 123 via the network 150. The configurable goal 475 and funnel 476 modules associate the media player state data received from each media player 115 with a stored video-related goal (such as one customized to track the number of successive webpage visits with video views) and a stored video funnel (such as one that includes steps for each of the successive webpage visits), respectively, using identifying information such as video IDs of the viewed videos and a browser session identifier.

The analytics module 480 includes software and routines executable by the processor 406 for determining metrics for events, analyzing events that reflect user interest in, and interaction with, video data being played by the media player 115, and generating video funnel analytics data from event data and one or more video-related goals and associated video funnels defined by a publisher.

A metric is a term categorizing an event. For example, a metric is a category describing one of player loads, video views, viewing 25% of a video, viewing 50% of a video, viewing 75% of a video, viewing 100% of a video, automatic plays, manual plays, monetizable views, an ad being watched, an ad being clicked, an ad being abandoned, sharing a video via email, sharing a video via an embed copy, sharing a video via a website, marking a video as a liked or disliked video, marking a video as a favorite video, turning caption on or off for a video, switching a caption from one language to another language, adding a comment for a video, subscribing to a video, dropping off a video, age-gating, user login, generating a queue for playback, saving for later view, and any other events triggered by a publisher's customization of the media player 115. The analytics module 480 stores metrics in the analytics store 420.

In one embodiment, the analytics module 480 maintains a list of metrics for events, including custom events, and stores event data describing the events in the analytics store 420 according to the metrics. For example, the analytics module 480 determines a metric for an event and stores event data describing the event in a storage section that is designated for the metric. The analytics module 480 determines whether the metric for the event is a new metric (e.g., new metric for a new custom event). For example, the analytics module 480 checks whether the metric is included in the list of metrics and determines the metric as a new metric if the metric is not in the list. The analytics module 480 adds the new metric to the list and stores the event in the analytics store 420 according to the new metric.

In another embodiment, the analytics module 480 analyzes event data describing custom events related to a feature customized by a publisher and obtains video funnel analytics data describing satisfaction of one or more video-related goals based at least in part on user interactions with the feature. To learn the user interactions with the customized feature is beneficial, because it provides feedback on a publisher's customization of the media player 115 and facilitates the evaluation of the customization in relation to the publisher's video funnels associated with video-related goals. For example, the analytics module 480 analyzes all the custom events related to a customized feature of generating a queue for playback and obtains video funnel analytics data showing that including a queue for playback to view videos in the media player 115 increases successive views (e.g., decreases the number of drop-outs after the viewing of a first video). In this example, the analytics module 480 generates video funnel analytics data showing satisfaction of a first step, an initial video view, and a second step, use of the queue for successive video views, and a third and final step of obtaining a 30% increment of video views for the video. The analytics module 480 stores the video analytics data in the analytics store 420. In one embodiment, the analytics module 480 sends the video analytics data to the reporting module 485.

In another embodiment, the analytics module 480 analyzes website usage data from one or more webpages and generates web analytics data showing conversion of video-related goals by analyzing the steps, or intermediate goals, of video funnels associated with the video-related goals. For example, the analytics module 480 analyzes all the website usage data for a webpage and generates web analytics data describing that over 80% of users visiting the webpage clicked a link, a required first step of a video funnel, to view a video advertisement on a media player 115 embedded in the webpage. The analytics module 480 stores the web analytics data in the analytics store 420. In one embodiment, the analytics module 480 sends the web analytics data to the reporting module 485.

In yet another embodiment, the analytics module 480 analyzes associated and stored website usage data, media player state data and one or more video funnels and affiliated video-related goals to generate video funnel analytics data that illustrate the conversion performance of the video-related goals. For example, a product seller sets a video-related goal to increase the sales of the shoe by 10% by including a video advertisement of the shoe on the product page for the shoe. In setting the video-related goal, the seller defines a video funnel tracking the number of visits to the product webpage, the number of video views of the shoe advertisement via media player 115, the number of clicks on a purchase link for viewers who have watched the video advertisement, and the number of sale confirmation webpage loads confirming purchase of the shoe. In generating video funnel analytics, the analytics module 480, for example, analyzes, for a specific time period, the effect of having the video on the product page by determining how many visitors exit the product page without viewing the video or purchasing the shoe, how many visitors watch the video and purchase the shoe, and how many visitors do not watch the video and purchase the shoe, based at least in part on the stored association between the website usage data received for the product page and the media player state data received from the media player 115 playing the video advertisement.

In yet another embodiment, the analytics module 480 retrieves event data describing events and metrics related to the events from the analytics store 420. For example, the analytics module 480 retrieves event data and metrics associated with the event data such as video views, viewing 25% of a video, viewing 50% of a video and viewing 75% of a video. The analytics module 480 calculates a value for each metric using the event data. For example, the analytics module 480 calculates the number of total video views, the number of video views that have a viewing of 25% of a video, the number of video views that have a viewing of 50% of a video and the number of video views that have a viewing of 75% of a video. The analytics module 480 also determines geographic information related to the event data. For example, the analytics module 480 determines one or more geographic locations where users view the video. The analytics module 480 stores the values for the metrics and the geographic information as a portion of analytics data in the analytics store 420.

The reporting module 485 includes software and routines executable by the processor 406 to generate a report for a user. In one embodiment, the reporting module 485 retrieves analytics data, event data and video funnel and video-related goal definitions from the analytics store 420, generates a report based at least in part on the analytics data, event data, and the video funnel and video-related goal definitions, and sends the report to the user via the user interface module 490, the communication device 450, and the network 150. The report includes one or more of web analytics data, video funnel analytics data, video-related goal analytics data and other analytics results generated by the analytics module 480. The report depicts visualizations of video funnels showing effectiveness of defined user paths for video-related goals such as web and video content consumption and sales conversions. For example, the visualizations illustrate the navigation flow of users as they navigate toward a video-related goal.

In one embodiment, the report generated by the reporting module 485 includes a visualization of the video funnel depicting how many users satisfy each step of the video funnel and how many users do not, and thus depicts whether possible lost opportunities exist at each step of the video funnel. The report also depicts how many users ultimately achieve the final step of the video funnel, which, in one embodiment, is the video-related goal itself.

In one embodiment, the reporting module 485 includes data describing one or more predefined reports to expedite generation of the predefined reports. A predefined report is a report with content predefined by an administrator. For example, a predefined report is a video viewing report with predefined content such as identifying whether the number of total video views and unique video views (e.g., views from unique users) for a video satisfies an affiliated video-related goal. The reporting module 485 receives a selection of a predefined report from a user, retrieves analytics data (e.g., web analytics data, video goal analytics data, etc.) from the analytic store 420 and generates the selected predefined report.

Alternatively, the reporting module 485 receives a description of a report from the communication device 450, allowing a user (e.g., a publisher of a video) to specify parameters for generating a customized report via, for example, the user interface module 490. A customized report is a report customized by a user. For example, a customized report is a report including a description of video funnel analytics data within a specified geographic location, user interactions with features customized by a publisher in the media player 115 affiliated with one or more steps of a video funnel, the frequency with which users perform certain types of interaction with a media player 115 and how the customization of the media player 115 affects the views of the video, etc. In one embodiment, the reporting module 485 provides a customized report to a publisher showing a majority of viewers progressed beyond an initial step of viewing an introductory video and viewed additional videos in a video series due to user interactions with a customized feature in the media player 115.

In one embodiment, the parameters for generating a report are steps of video funnels and metrics associated with the steps of the video funnels. For example, the parameters for generating a report are a video funnel step of at least 50% viewing of a video by viewers using metrics of total video views and viewing 50% of a video so that a report associated with total video views and viewing 50% of a video will be generated. The reporting module 485 retrieves values for the metrics and geographic information related to the events associated with the video funnel steps from the analytics store 420. The reporting module 485 constructs one or more of visualizations, charts, diagrams and tables using the values of the metrics and the geographic information. For example, the reporting module 485 generates a table including fields such as the total number of video views for a video, the total number of video views with a viewing of 50% of the video (a step of the video funnel) and the number of videos views for different geographic locations. The reporting module 485 generates a report using the visualizations, charts, diagrams, and tables by incorporating the charts, diagrams and tables into the report.

The analytics store 420 is a persistent storage device that stores data received from at least a user device 160, a media player 115, the analytics engine 125, the configurable goal module 475, the configurable funnel module 476, the ping analysis module 470 and the communication device 450. For example, the analytics store 420 stores one or more of video IDs, video versions, metrics for events, event data describing events, event data describing custom events, location data, session data, geographic information for events and custom events, video funnel data, video-related goal data, and other analytics data received from the analytics engine 125 such as website usage data, web analytics data, and video analytics data.

As an example, when a user device 160 accesses a first webpage from a destination site 170, the analytics engine 125 receives data from the user device 160 identifying that the first webpage was accessed by the user device 160 and stores the data in the analytics store 420. While accessing the first webpage, if a user accesses video data included in the first webpage, the media player 115 used to access the video data transmits a view request to the analytics engine 125 via the network 150 indicating that the video data is being viewed. The analytics engine 125 stores the view request from the media player 115, allowing the analytics store 420 to store data indicating that the first webpage was initially accessed and then the video data was accessed. In one embodiment, the analytics store 420 stores web analytics data and video analytics data using a unique identifier, such as a session identifier or a user identifier, so that interactions with webpages and video data during a visit are maintained according to the unique identifier. This provides the benefit of tracking video views by a viewer across multiple viewing sessions occurring on the same or different websites. The analytics store 420 is further described below with reference to FIG. 5.

The advertisement storage ("ad storage") 425 is a persistent storage device that stores data for advertisements. For example, the ad storage 425 stores one or more advertisements to be played in conjunction with a video or stores video data sorted by video ID for direct playback by a media player 115. In one embodiment, the ad storage 425 stores metadata for an ad (e.g., a title, a keyword and a description for the ad), allowing the ad determination module 465 to determine an ad for a video by matching the metadata of the ad against the metadata of the video. For example, the ad determination module 465 compares a keyword describing the video with keywords for the ads stored in the ad storage 425 and selects an ad with the same keyword as the video. In another embodiment, the ad storage 425 stores rules for selecting and displaying advertisements. For example, the ad storage 425 stores rules for displaying advertisements as pre-roll ads (e.g., ads played before playing a video), mid-roll ads (e.g., ads played in the middle of playing a video) and post-roll ads (e.g., ads played after playing a video).

Analytics Store 420

Figure 5:
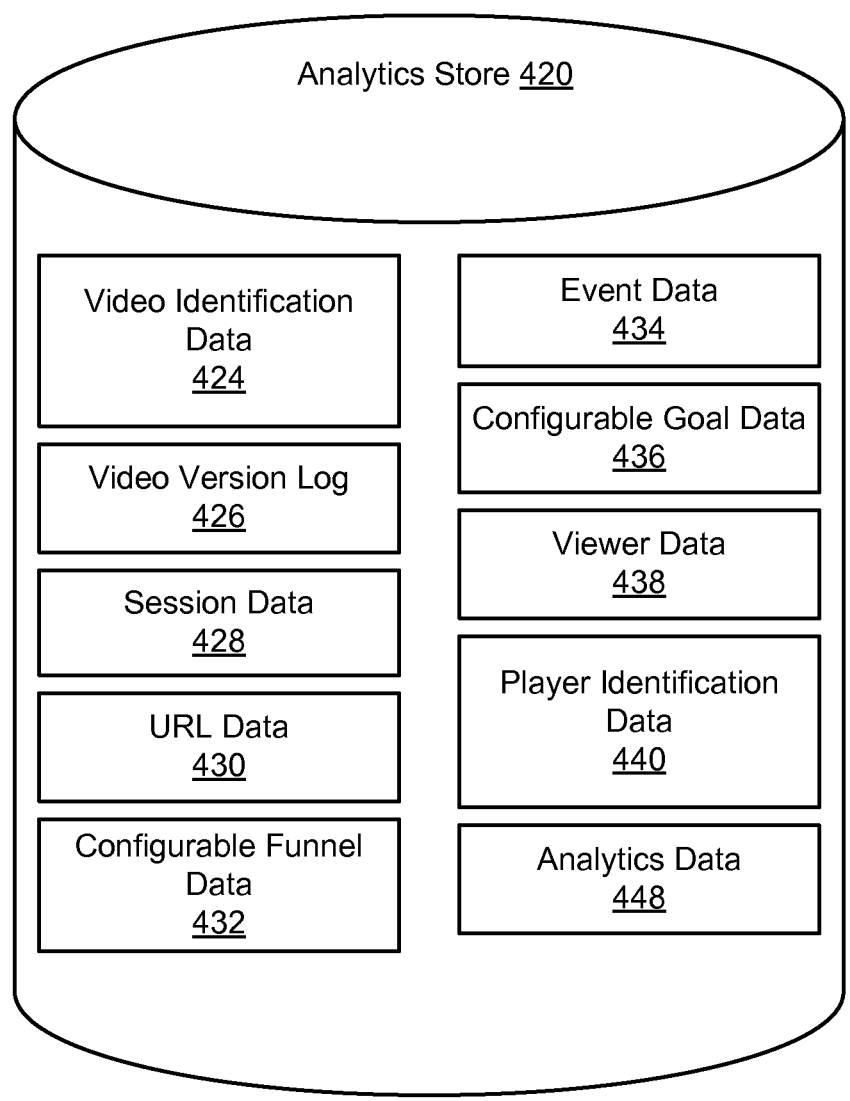
FIG. 5 is a block diagram illustrating one embodiment of an analytics store.

FIG. 5 is a block diagram illustrating one embodiment of the analytics store 420. In the depicted embodiment, the analytics store 420 includes video identification data 424, a video version log 426, session data 428, URL data 430, configurable funnel data 432, event data 434, configurable goal data 436, viewer data 438, media player identification data 440 and analytics data 448. In one embodiment, media player state data received from a media player 115 is parsed by the ping analysis module 470 and stored as video identification data 424, video version log 426 data, URL data 430, event data 434, player identification data 440, session data 428 and viewer data 438. In one embodiment, the analytics store 420 also stores time and date information related to the media player state data, web analytics data and website usage data. Persons of ordinary skill in the art will recognize that the analytics store 420 may also store raw data received by the analytics engine 125, location data for a video, domain restriction data for a media player 115 and other data to provide functionalities described herein.

The video identification data 424 is data identifying a video. In one embodiment, the video identification data 424 include a unique video ID that distinguishes one video from another video. In one embodiment, the video identification data 424 also include the name of a publisher, a time and date of publication, a title for the video, and other video attributes.

The video version log 426 is a log recording various video versions of a video. For example, a publisher first publishes a video with a video version v1 and then proceeds to revise the video and republish the video with video version v2. When a viewer interacts with the media player 115, the media player 115 sends a ping including the video ID, a video version (e.g., v2), and an event for the video being interacted with. Once received, the video version log 426 stores information included in the ping according to the video version included therein so the analytics module 480 can associate each event with the appropriate video version in the reports generated by the analytics module 480. In one embodiment, the video version log 426 includes all the video versions for a video and associations between each video version and the events, including custom events, related to each video version.

The session data 428 are data received from a user device that relates website usage data and media player data with video-related goals and one or more steps of video funnels affiliated with the video-related goals. For example, session data include an association of website usage data and media player state data with one or more steps of video funnels using a unique identifier, such as a media player session identifier, a browser session identifier corresponding to the webpage collecting website usage data, data from a cookie stored by a web browser or the media player 115, or any other identifier related to both the website usage data and media player state data.

The configurable funnel data 432 are data received from the configurable funnel module 476. For example, the configurable funnel data 432 include an association between one or more steps of the video funnel defined via an interface generated by the user device 160 based on instructions from user interface module 490, and media player state data received from a media player 115.

The event data 434 is data describing events, including custom events. In one embodiment, the player state data 434 describe all the events triggered in a media player 115, detected by the event module 292 of the media player 115 and communicated to the analytics engine 125 by the ping module 291 of the media player 115. In another embodiment, the event data 434 include a combination of events and custom events, where the custom events are caused by one or more customized features in the media player 115 and user interactions triggering events associated with the one or more customized features. For example, the event data 434 include data describing a viewer's agreement to a publisher's terms and conditions for viewing a video. In this example, the viewer's selection of a play button of a media player 115 to begin playback of a video triggers a prompt for the viewer to accept the publisher's terms and conditions for viewing the video, and the viewer's acceptance of the publisher's terms is detected by the event module 292 of the media player 115 and sent to the ping module 291 for communication to the analytics server 123 via the network. In this example, acceptance of the terms and conditions constitutes a custom step in the video funnel, and video funnel analytics generated by the analytics engine would report the number of users dropping out due, at least in part, to the requirement to accept.

The configurable goal data 436 are data received from the configurable goal module 475. For example, the configurable goal data 436 include an association between one or more video-related goals defined via an interface generated by the user device 160 based on instructions from user interface module 490, and media player state data received from a media player 115.

The viewer data 438 are data received from a media player 115 related to a viewer. For example, the viewer data 438 include a unique identifier for a viewer, such as a username, an email address, or other handle, IP address information, geographic information, viewer preferences, user device information (e.g., operating system information), and other information attributable to the viewer (e.g., age, gender, etc.).

The player identification data 440 are data received from a media player 115 that uniquely identify the media player 115 and distinguish it from other media players 115. For example, player identification data 440 include a media player ID and version information describing the version of software the media player was built using and the date the media player was built.

The analytics data 448 are data received from or generated by the analytics engine 125. For example, the analytics data 448 include one or more of web analytics data, video funnel analytics data, video-related goal analytics data, metrics, categories for metrics, values for metrics, geographic information for custom events and other analytics results generated by the analytics engine 125. The analytics data 525 provide a basis for generating a video-related goal and video funnel report to a user. For example, the reporting module 485 retrieves a portion of the analytics data 525 based at least in part on some parameters for a report and generates the report using the portion of analytics data 525. In one embodiment, the analytics engine 125 generates all the analytics data. In another embodiment some of the analytics data 448 is generated remotely and transmitted to the analytics server 123 for use by the reporting module 485 of the analytics module 480.

Methods

Figure 6:
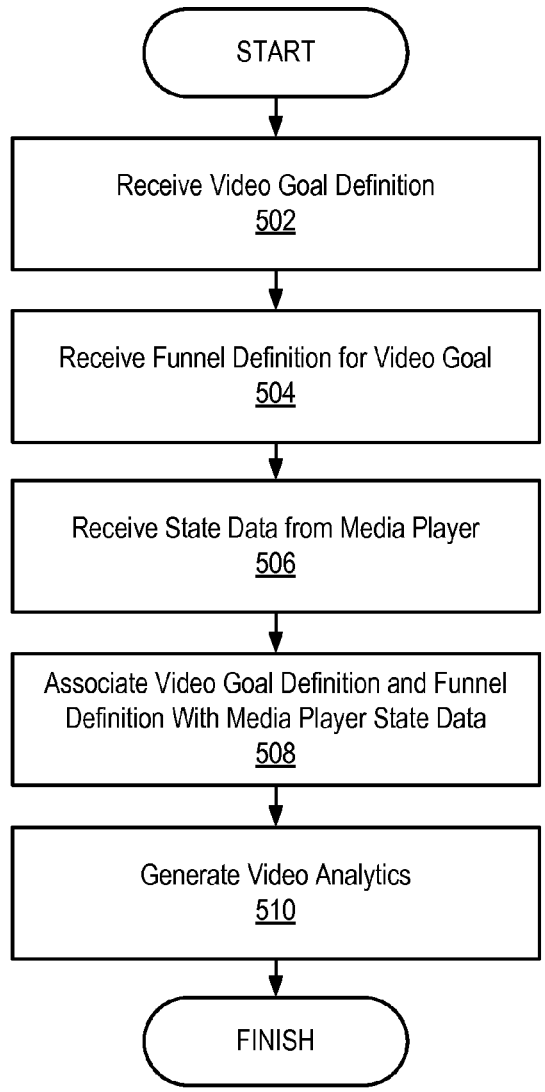
FIG. 6 is a flow diagram illustrating one embodiment of a method for generating video funnel analytics.

Referring now to FIGS. 6-11, various embodiments of the method of the specification will be described. FIG. 6 is a flow diagram illustrating one embodiment of a method 500 for generating video funnel analytics based at least in part on a video-related goal definition, a video funnel definition and media player state data. In the example shown by FIG. 6, the analytics engine 125 receives 502 a video-related goal definition from a user device 160. The analytics engine 125 also receives 504 a video funnel definition for the video-related goal definition from a user device 160 displaying the graphical user interface 1100. In one embodiment, the configurable goal module 475 receives the video-related goal definition and the configurable funnel module 476 receives the video funnel definition.

The analytics engine 125 receives 506 media player state data including event data describing events occurring in association with a media player 115. In one embodiment, the ping analysis module 470 receives media player state data in the form of a ping from the media player 115 via the communication module 460. For example, the ping analysis 470 module parses the media player state data and stores the associated media player state data in the analytics store 420.

The analytics engine 125 then associates 508 the video-related goal definition and the media player state data. In one embodiment, the configurable funnel module 476 associates the media player state data with the video funnel definition using a video ID parsed from the media player state data by the ping analysis module 470, and then stores data reflecting the association in the analytics store 420. In another embodiment, the configurable goal module 475 also associates the media player state data with the video-related goal definition.

The analytics engine 125 then generates 510 video funnel analytics based at least in part on the associated media player state data, the video-related goal definition and the video funnel definition. During the generating 510, for example, the analytics module 480 determines whether, for each viewer, all optional and required steps of a video funnel have been satisfied and the video-related goal. In doing so, the analytics module 480 retrieves the associated media player state data, the video funnel definition and the video-related goal definition from the analytics store 420, computes any necessary metrics needed for comparison to the steps of the video funnel definition and the criterion included in the video-related goal definition, and compares the steps of the video funnel definition and the criterion included in the video-related goal definition to the metrics and the media player state data to determine whether, for each viewer, the steps of the video funnel definition and the criterion included in the video-related goal definition have been satisfied.

For example, the analytics engine 125 retrieves media player state data indicating that a video was viewed and a mid-roll ad was clicked during viewing of the video, and retrieves website usage data indicating that the viewer of the video was redirected to a website that sells the advertised product and purchased the advertised product. From the retrieved media player state data and website usage data, the analytics engine 125 generates analytics data stating that the first step of a video funnel requiring a video view was satisfied, the second step of the video funnel requiring a mid-roll add be clicked was satisfied, and the third step requiring confirmation that the product advertised in the mid-roll ad was purchased, was satisfied.

Figure 7A:
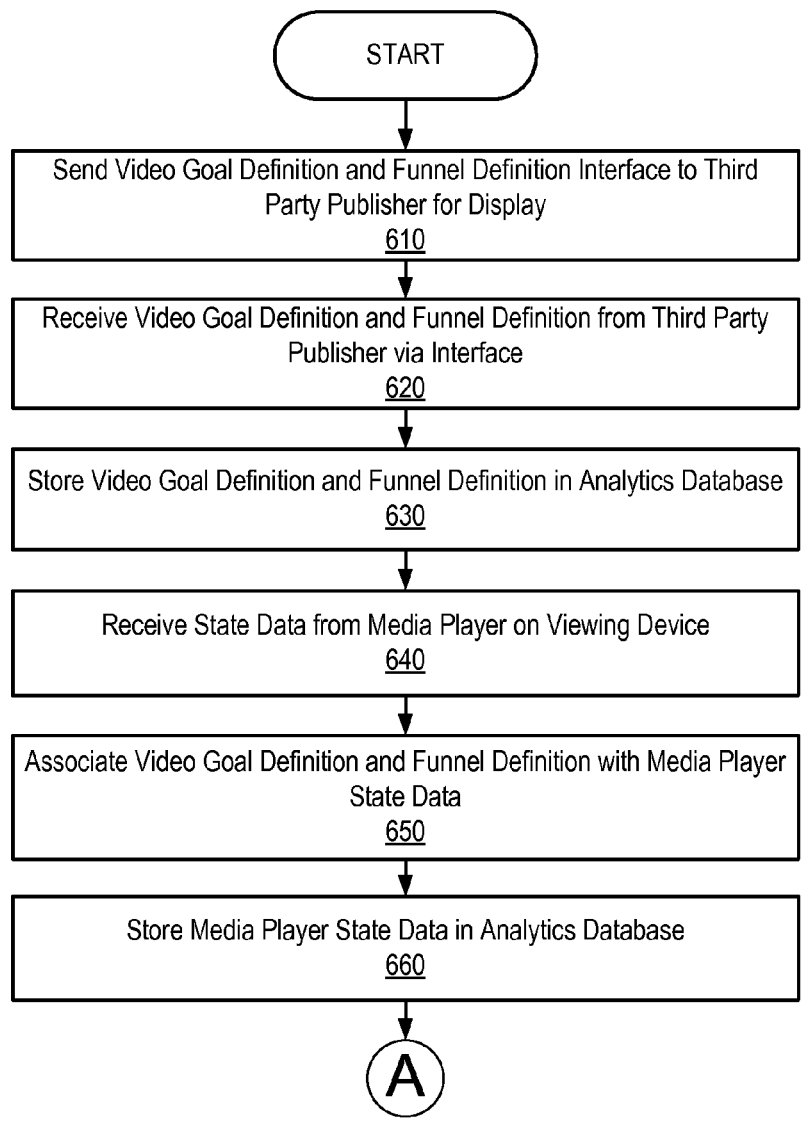
FIGS. 7A and 7B are flow diagrams illustrating one embodiment of a method for generating video funnel analytics.
Figure 7B:
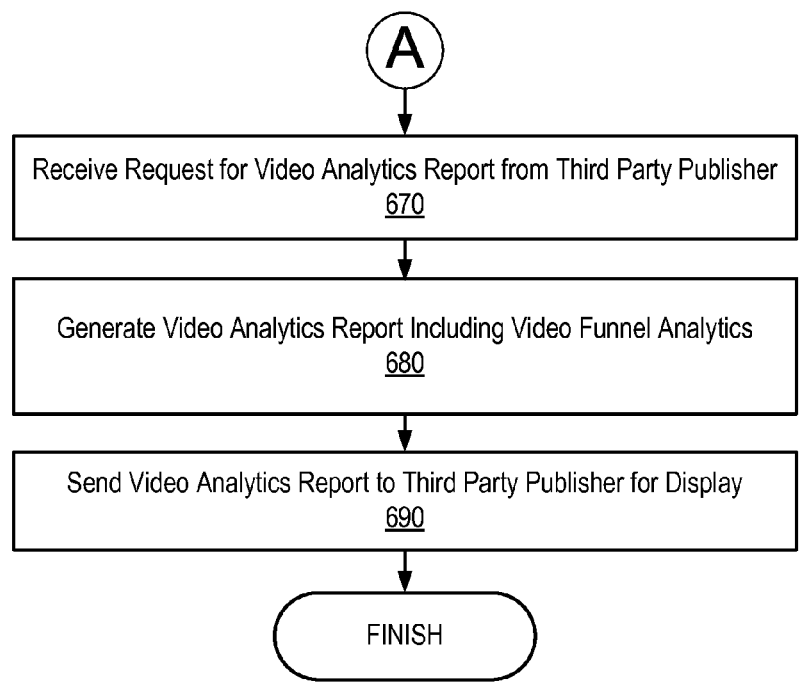

FIGS. 7A and 7B are flow diagrams illustrating one embodiment of a method 600 for generating video funnel analytics based at least in part on a video funnel definition, an associated video-related goal definition and media player state data. In the example shown by FIGS. 7A and 7B, the analytics engine 125 generates and sends 610 instructions for a video-related goal definition and video funnel definition interface to user device 160 of a third party publisher. In one embodiment, the user interface module 490 generates instructions for the graphical user interface 1100 depicted in FIG. 12 and sends the instructions via the communication device 450 and network 150 to the user device 160 to be rendered for display via a processor 206 of the user device.

The analytics engine 125 receives 620 a video-related goal definition and an associated video funnel definition from a user device 160 of a third party publisher. In one embodiment, the third party publisher defines a video-related goal and video funnel using the inputs of the graphical user interface 1100 and submits the video-related goal definition and the video funnel definition to the analytics server 123 via the network 150. The video-related goal definition is received 620 by the communication device 450 of the analytics server 123 and routed to the configurable goal module 475 via the communication module 460. The video funnel definition is received 620 by the communication device 450 of the analytics server 123 and routed to the configurable funnel module 476 via the communication module 460.

After receiving the video-related goal definition, the configurable goal module 475 stores 630 the video-related goal definition. In one embodiment, the configurable goal module 475 stores 630 the video-related goal definition as configurable goal data 436 in the analytics store 420. After receiving the video funnel definition, the configurable funnel module 476 stores 630 the video funnel definition. In one embodiment, the configurable funnel module 476 stores 630 the video funnel definition as configurable funnel data 432 in the analytics store 420.

The analytics engine 125 receives 640 media player state data from one or more media players 115 included on one or more user devices 160. In one embodiment, the ping analysis module 470 receives 640 the media player state data in the form of pings sent by the one or more media players 115 on the one or more user devices 160. For example, the ping analysis 470 module parses the media player state data as it is received from the one or more media players 115.

The analytics engine 125 associates 650 the media player state data received from the one or more media players 115 with the stored video-related goal definition and video funnel definition. In one embodiment, the configurable funnel module 476 associates the video funnel definition with the received media player state data parsed by the ping analysis module 470. For example, the configurable funnel module 476 uses one or more unique identifiers, such as a session identifier, a URL and/or a video ID, to associate 650 the video-related goal and video funnel with media player state data received from the one or more media players 115 and website usage data received from a web browser. In another embodiment, the configurable goal module 475 also associates the video-related goal definition with the received media player state data parsed by the ping analysis module 470.

The analytics engine 125 stores 660 the associated media player state data in the analytics store 420 including data reflecting the association between the media player state data and the video-related goal and video funnel definitions. For example, after parsing the media player state data, the ping analysis module 470 stores 660 the video ID, the video version, the embedded URL, and the event included in the media player state data as video identification data 424, video version log 426, URL data 430, and event data 434 in the analytics store 420, respectively. The configurable goal module 475 stores data associating the media player state data with the video-related goal definition as configurable goal data 436 in the analytics store 420. The configurable funnel module 476 stores data associating the media player state data with the video funnel definition as configurable funnel data 432 in the analytics store 420. In another embodiment, the ping analysis module 470 also stores 660 one or more of the raw media player state data and website usage data in the analytics store 420 for later use by the analytics engine 125. In yet another embodiment, the analytics engine 125 also stores 660 website usage data in the analytics store 420.

When the analytics engine 125 receives 670 a request for an analytics report from a user device 160 of the third party publisher, the analytics engine 125 generates 680 video funnel analytics based at least in part on the associated media player state data and the video funnel and video-related goal definitions. In another embodiment, the analytics engine 125 generates 680 video funnel analytics based at least in part on one or more of the associated media player state data, website usage data, other stored analytics data, and the video funnel and video-related goal definitions.

During the generating 680, for example, the analytics module 480 determines satisfaction of the steps of the video funnel definition by retrieving at least the associated media player state data, the video funnel definition, and the video-related goal definition from the analytics store 420, computing any necessary metrics needed for the comparison of the steps of the video funnel definition and the criterion included in the video-related goal definition to the metrics and the media player state data, and comparing the steps of the video funnel definition and the criterion included in the video-related goal definition to the metrics and the media player state data to determine whether the steps of the video funnel and the criterion of the video-related goal have been satisfied. In some examples, the analytics module 480 performs the retrieving periodically (e.g., a day, a week, a month, a season, etc.). In other examples, the retrieving is triggered by a request of a user (e.g., a publisher).

In one embodiment, the video analytics report is a rich report visually demonstrating the number of video-related goal conversions that have been achieved for a given period of time by virtue of satisfying all required steps of the video funnel, and the number of video-related goal conversions that have been lost and at which step of the video funnel the conversions were lost. For example, the reporting module 485 constructs visualizations, charts, diagrams and tables illustrating the steps of the video funnel, the totals for each step, the number of users exiting at each step, the number of users continuing to the next step, and the number of users reaching the final step and converting the video-related goal.

Once the analytics report is generated, the analytics engine 125 sends 690 the analytics report to the user device 160 of the third party publisher for review. For example, the reporting module sends the analytics report data to the user interface module 490, and the video interface module 490 generates instructions for an interface to display the analytics report data and transmits the interface to the user device of the third party publisher via the communication device 450 and the network 150 to be rendered for display on the user device 160 via a web browser loaded on the user device 160.

Figure 8:
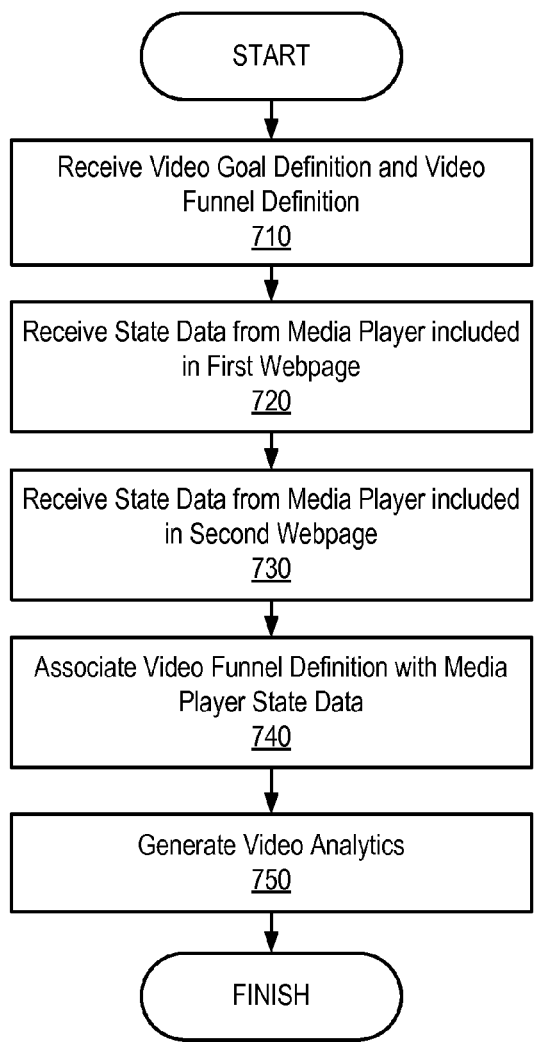
FIG. 8 is a flow diagram illustrating one embodiment of a method for generating cross-site video funnel analytics.

FIG. 8 is a flow diagram illustrating one embodiment of a method 700 for generating cross-site video funnel analytics based at least in part on a video-related goal definition, a video funnel definition and media player state data. In the example shown by FIG. 8, the analytics engine 125 receives 710 a video-related goal definition and video funnel definition from a user device. In one embodiment, the configurable goal module 475 receives the video-related goal definition and the configurable funnel module 476 receives the video funnel definition from a user device 160 displaying an interface generated by the user interface module 490.

The analytics engine 125 receives 720 media player state data including event data from a first media player 115 loaded in a first webpage on the user device 160. After receiving 720 media player state data including the event data from the first media player 115, the analytics engine 125 receives 730 media player state data including event data from a second media player 115 loaded in a second webpage on the user device. For example, the analytics engine 125 receives 720 media player state data including events indicating a viewer viewed a video with the first media player 115 on the first webpage. The analytics engine 125 then receives 720 media player state data including events indicating the viewer clicked an advertisement displayed by the first media player was redirected to the second webpage. The analytics engine then receives 730 media player state data including events indicating the viewer viewed a video with the second media player 115 on the second webpage.

The analytics engine 125 associates 740 the video-related goal definition and the media player state data received from the first media player 115 and the second media player 115. In one embodiment, configurable funnel module 476 associates the media player state data with the video funnel definition using a referrer identifier, such as a referring webpage address and video IDs parsed from the media player state data by the ping analysis module 470, and then stores data reflecting the association in the analytics store 420. In another embodiment, the first webpage and the second webpage are located on different websites and a third party cookie is used to track cross-site traffic. In yet another embodiment, the configurable goal module 475 may also associate media the player state data and/or website usage data received from the first webpage or the second webpage with the video-related goal definition using an identifier, such as a referring webpage address, and then store data reflecting the association in the analytics store 420.

The analytics engine 125 then generates 750 goal-based video analytics including video funnel analytics based at least in part on the associated media player state data and the video funnel and video-related goal definitions. In another embodiment, the analytics engine 125 generates 680 video funnel analytics based at least in part on one or more of the associated media player state data, website usage data, other stored analytics data, and the video funnel and video-related goal definitions.

During the generating 750, for example, the analytics module 480 determines satisfaction of the steps of the video funnel definition for the video-related goal by retrieving at least the associated media player state data, the video funnel definition, and the video-related goal definition from the analytics store 420, computing any necessary metrics needed for the comparison of the steps of the video funnel definition and the criterion included in the video-related goal definition to the metrics and the media player state data, and comparing the steps of the video funnel definition and the criterion included in the video-related goal definition to the metrics and the media player state data to determine whether the steps of the video funnel and the criterion of the video-related goal have been satisfied. The analytics engine is not limited to receiving media player state data from a first and second media player 115, but can receive media player state data from any number of media players 115 located on webpages hosted on the same or different web domains, and can associate the media player state data from the any number of media players 115 with the appropriate video funnels using available identifiers. The generating 750 can also generate video analytics reports as previously described.

Figure 9:
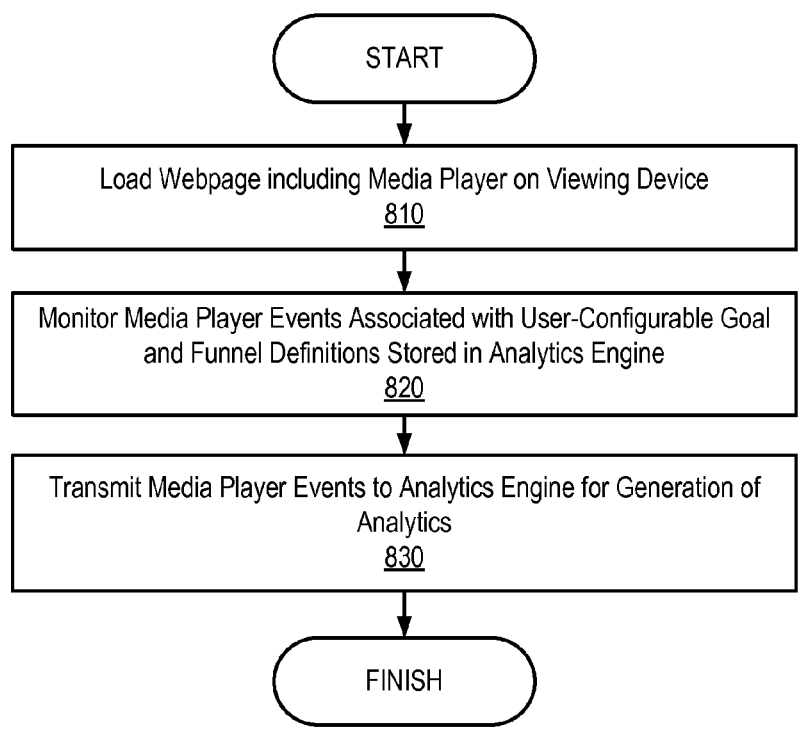
FIG. 9 is a flow diagram illustrating one embodiment of a method for capturing events associated with a user-configurable video funnel and sending the events to an analytics server.

FIG. 9 is a flow diagram illustrating one embodiment of a method 800 for capturing events associated with a user-configurable video funnel and sending the events to the analytics server 123. In the example shown by FIG. 9, a viewer instructs a user device 160 to load 810 a webpage including a media player 115.

Upon loading, the media player 115 captures 820 events occurring in the media player 115 which are associated with a video funnel of a video-related goal configured by a publisher and stored in the analytics server 123. In one embodiment, the media player 115 captures video playback activity and user interaction with the media player 115. For example, the media player 115 captures events such as the start of a video view, the displaying of an advertisement, the clicking of an advertisement by a viewer, etc.

When an event is captured, the media player instructs the user device 160 to transmit 830 media player state data to the analytics server 123 via the network 150 and the communication device 450. For example, the media player 115 instructs the user device to send a hypertext transfer protocol "get" request including parameters identifying a video and an event occurring in association with the video.

Figure 10:
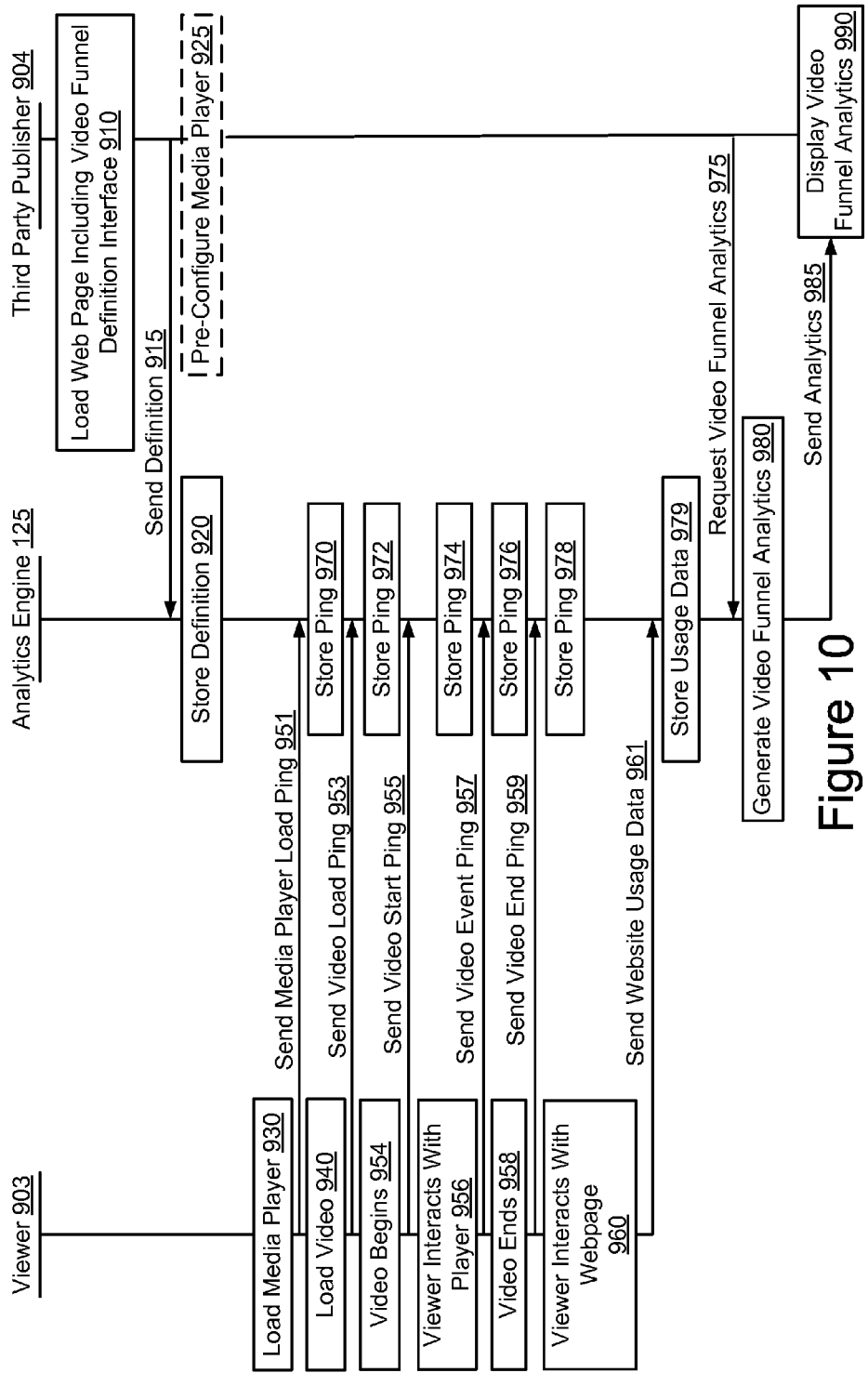
FIG. 10 is an event diagram illustrating one embodiment of a method for configuring a video funnel for a video-related goal, capturing media player state data and generating video funnel analytics.

FIG. 10 is an event diagram illustrating one embodiment of a method for configuring a video funnel for a video-related goal, capturing media player state data from a media player 115 affiliated with the video funnel and generating video funnel analytics from the video funnel, the video-related goal and the events. As with all the illustrative embodiments here, FIG. 10 illustrates one of many possible scenarios demonstrating the interaction between the elements of the system 100 for generating video funnel analytics, and should not be construed as limiting. In the example shown by FIG. 10, a third party publisher 904 instructs a user device 160 to load 910 a webpage that includes a video-related goal definition and video funnel definition interface provided by user interface module 490. A third party publisher 904 inputs data into the interface and instructs the user device 160 to send 915 a video funnel definition and associated video-related goal definition to the analytics server 125. The analytics server 123 receives the definitions and stores 920 them in the analytics store 420. A viewer 903 on a user device 160 instructs the user device 160 to load a webpage including embedded instructions to load 930 a media player 115. Optionally, as indicated by the dashed lines, a publisher may pre-configure 925 the media player 115 being loaded to include customized features and logic to detect events associated with the customized features. In an embodiment where the media player 115 is customized, instructions for the customizations to the media player 115 are received by the media player 115 via the communication module 290 of the viewer's user device 160 from one or more of the destination site 170, the third party video server 180 or the content management system 110, for example.

Once the media player 115 is loaded 930 by the viewer's user device 160, the media player 115 instructs the viewer's user device 160 to send media player state data, i.e., media player load ping 951, to the analytics server 123 indicating that the media player has been loaded on the viewer's user device 160, and the analytics server 123 processes and stores 970 the media player load ping 951 in the analytics store 420.

The media player 115 then proceeds to load video data 940 streaming from a video content source, such as the destination device 170, the third party video server 180, or the content management system 110, via the network 150 to the viewer's user device 160. Once a predetermined amount of the video data has been loaded, the media player 115 instructs the viewer's user device 160 to send a video load ping 953 to the analytics server 123 and the analytics server 123 processes and stores 972 the video load ping 953 in the analytics store 420.

Once playback of the video begins 954, the media player 115 instructs the viewer's user device 160 to send a video start ping 955 to the analytics server 123 indicating that playback of the video has begun. The analytics server 123 processes and stores 974 the video start ping 955 in the analytics store 420. In one embodiment, playback of the video begins automatically once the media player 115 has been loaded by a viewer's web browser launched on the viewer's user device 160. In another embodiment, a viewer initiates playback manually by selecting a play button of the media player 115. In response, the media player instructs the user device 160 to send (not shown) a video playback request to the video server hosting the video, the video server sends (not shown) the video data stream over the network to the media player 115 in response to the request, and the media player receives (not shown) the video data stream and commences 954 playback.

During playback of the video, the viewer interacts 956 with the media player 115 and the media player 115 detects the viewer's interaction with the media player and instructs the viewer's user device 160 to send an event ping 957 to the analytics server 123, and the analytics server 123 processes and stores 976 the event ping 957 in the analytics store 420. In one embodiment, for example, the third party publisher 904 defines a video funnel to achieve a series of interactions with an interactive feature (e.g., an advertisement layered over the video data) included in a customized media player 115. The publisher customizes the media player 115 to include the interactive feature 115 and instructs the media player 115 to detect when and how a viewer interacts with the interactive feature. When a viewer interacts 960 with the interactive feature (e.g., clicks on the advertisement layered over the video data), the media player 115 detects the event instructs the user device 160 to send an event ping 957 to the analytics server 123 indicating that the user interacted with the interactive feature.

Once video playback ends without abandonment 958, the media player 115 detects the event and instructs the viewer's user device 160 to send a video end ping 959 to the analytics server 123 and the analytics server 123 processes and stores 978 the video end ping 959 in the analytics store 420.

After viewing the video, the viewer interacts with the webpage in which the media player 115 is embedded. The web browser in which the webpage is loaded instructs the user device 160 to send 961 website usage data describing the interaction of the user with the webpage to the analytics engine 125. The analytics engine stores 979 the website usage data in the analytics store 420. For example, a viewer, after watching a video advertising a particular shoe, purchases the shoe by clicking on the purchase link situated on the webpage in proximity to the media player 115 and proceeding through the purchase process until a purchase confirmation page is loaded by the web browser. The web browser sends website usage data reflecting the viewer's actions with the webpage when purchasing the shoe to the analytics engine 125 for use in generating the video funnel analytics.

After a plurality of viewers 903 have viewed the video data and interacted with the webpage, and media players 115 on the viewers' user devices 160 have sent media player state data associated with the viewing of the video data and web browsers on the viewer's user devices 160 have sent website usage data associated with webpage interaction, a third party publisher 904 instructs a user device 160 to request 975 video funnel analytics from the analytics server 123 via the network 150. Responsive to this request, the analytics engine of 125 of the analytics server 123 generates 980 video analytics including video funnel analytics in the form of a report and instructs the communication device 450 to send the report to the publisher's user device 160 for display.

In one embodiment, the analytics engine 125 generates 980 the video funnel analytics by retrieving, for example, the event pings and the video funnel and video-related goal definitions stored in the video analytics store 420, and determining the number of steps of a video funnel have been achieved based an association between the event pings and the video funnel definition, and ultimately whether all required steps of the video funnel, and thus the video-related goal itself, have been satisfied. In one embodiment, the data included in the event pings is associated with the video funnel definition 115 by the configurable funnel module 476 receiving parsed event pings from the ping analysis module 470 and associating the parsed event pings with the video funnel definition using a video ID of the video data. The video analytics generated by the analytics engine 125 show, for example, user progression through the funnel and user drop-off points reflecting lost opportunity.

Figure 11:
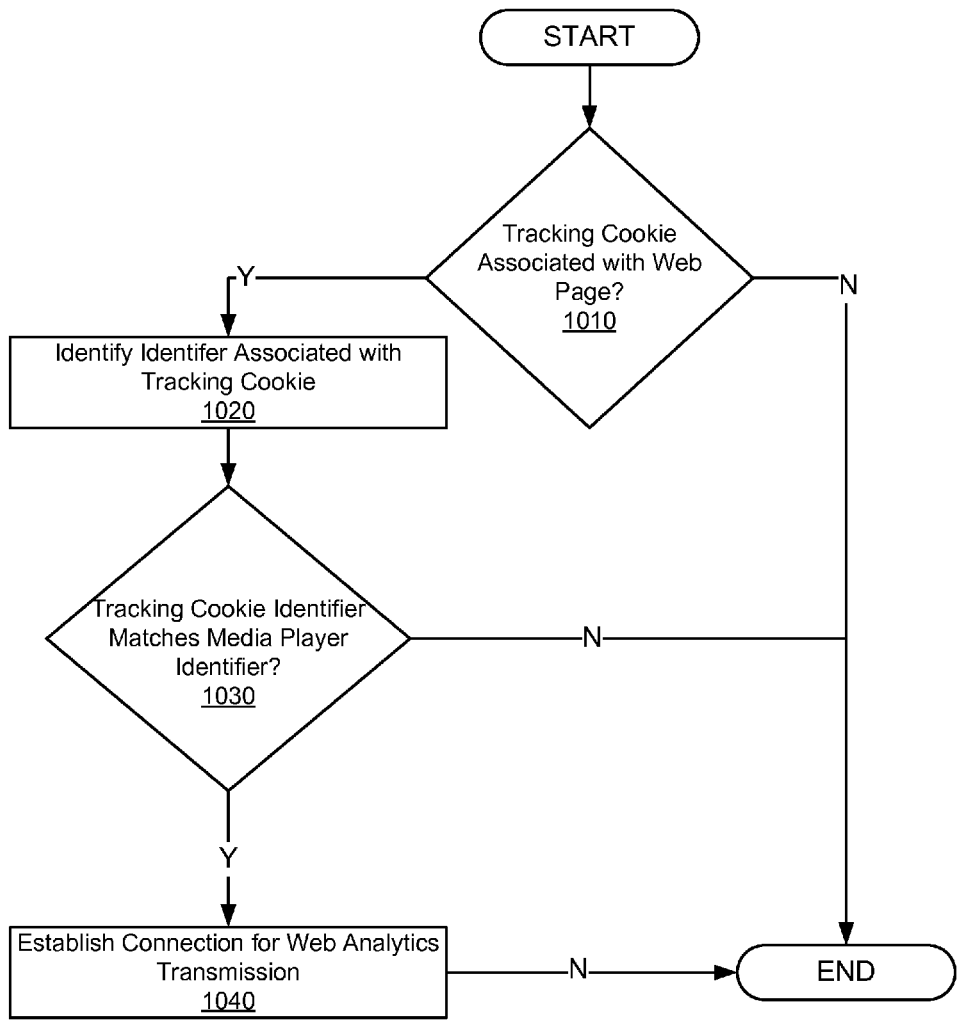
FIG. 11 is a flow diagram illustrating one embodiment of a method for determining whether to collect website usage data along with media player state data.

FIG. 11 is a flow diagram illustrating one embodiment of a method 1000 for determining whether to collect website usage data along with media player state data. In one embodiment, the steps identified by FIG. 11 are performed by the media player 115 executed on a user device 160.

Initially, the media player 115 determines 1010 whether a tracking cookie is associated with the webpage in which the media player 115 is launched. For example, the media player 115 places a call to the webpage to identify the webpage tracking cookie. If no information identifying the webpage tracking cookie is received from the webpage or if the media player is otherwise unable to identify the webpage tracking cookie, the method ends. Accordingly, website usage data is not transmitted to the analytics engine 125 because the webpage is not being tracked by the analytics engine 125; however, media player state data from the media player 115 are pinged to the analytics engine 125 to allow tracking of interactions for video data.

However, if the media player 115 determines 1010 that a webpage tracking cookie is associated with the webpage, the media player 115 identifies 1020 a unique identifier associated with the webpage tracking cookie. For example, the webpage communicates the webpage tracking cookie or data identifying the webpage tracking cookie to the media player 115. The media player 115 then identifies 1020 the unique identifier associated with the webpage tracking cookie. Alternatively, the webpage identifies 1020 the unique identifier associated with the webpage tracking cookie. In one embodiment, the unique identifier is a user ID.

The media player 115 then determines 1030 whether the unique identifier associated with the webpage tracking cookie matches a unique identifier associated with the media player cookie. If the unique identifier associated with the webpage tracking cookie does not match a unique identifier associated with the media player cookie, the method ends and website usage data is not transmitted to the analytics engine 125. For example, if the unique identifier associated with the webpage tracking cookie differs from the media player cookie, the webpage and the media player 115 are owned by different entities so that website usage data is not transmitted. However, the requests from the media player 115 are transmitted to the analytics engine 125.

Responsive to the unique identifier associated with the webpage tracking cookie matching the unique identifier associated with the media player cookie, the media player 115 initiates a command to establish 1040 a connection between the user device 160 and the analytics engine 125. In one embodiment, the media player 115 associates a browser session identifier or a media player session identifier with the tracking cookie and the media player cookie. The session identifier is included with the website usage data and the requests transmitted to the analytics engine 125. Associating a session identifier with the requests and the website usage data allows the analytics engine 125 to associate the received website usage data and requests with each other in a session that includes website usage data and requests.

The foregoing description of the embodiments has been presented for the purposes of illustration and description. It is not intended to be exhaustive or to limit the present embodiments to the precise form disclosed. Many modifications and variations are possible in light of the above teaching. It is intended that the scope of the present embodiments be limited not by this detailed description, but rather by the claims of this application. As will be understood by those familiar with the art, the present embodiments may be embodied in other specific forms without departing from the spirit or essential characteristics thereof. Likewise, the particular naming and division of the modules, routines, features, attributes, methodologies and other aspects are not mandatory or significant, and the mechanisms that implement the present embodiments or its features may have different names, divisions and/or formats. Furthermore, as will be apparent to one of ordinary skill in the relevant art, the modules, routines, features, attributes, methodologies and other aspects of the present embodiments can be implemented as software, hardware, firmware or any combination of the three. Also, wherever a component, an example of which is a module, of the present embodiments is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiments are in no way limited to implementation in any specific programming language, or for any specific operating system or environment. Accordingly, the disclosure intended to be illustrative, but not limiting, of the scope of the embodiments, which is set forth in the following claims.

What is claimed is:

1. A computer-implemented method for generating video funnel analytics, the method comprising:
   receiving, via a user interface, a user-configurable video-related goal definition that describes a video-related goal for a video playable by a media player included in a first webpage of a website on a user device;
   receiving, via the user interface, a user-configurable video funnel definition that describes a video funnel based at least in part on the video-related goal definition,
     wherein the video funnel definition specifies a navigational flow path that comprises a series of predetermined interactive operations to be performed by viewers of the video with respect to a first set of video data associated with the video,
     wherein the series of predetermined interactive operations comprises visiting the first webpage, watching the video and visiting a set of other webpages of the website, and
     wherein a satisfaction of the series of predetermined interactive operations indicates a conversion of the video-related goal;
   receiving a first set of media player state data describing interactions by one or more viewers of the video with the first set of video data associated with the video; and
   generating, by a processing device, video funnel analytics based at least in part on the video-related goal definition, the video funnel definition and the first set of media player state data, the video funnel analytics indicating whether the series of predetermined interactive operations were performed by the one or more viewers of the video.

2. The computer-implemented method of claim 1, wherein the video funnel definition includes each of the predetermined interactive operations corresponding to a predetermined event of a plurality of predetermined events, and an occurrence of one or more of the plurality of predetermined events corresponding to the conversion of the video-related goal described by the video-related goal definition.

3. The computer-implemented method of claim 2, wherein generating the video funnel analytics further comprises analyzing the first set of media player state data for data describing the occurrence of the one or more of the plurality of predetermined events.

4. The computer-implemented method of claim 1, wherein the first set of media player state data includes a first video data identifier identifying the first set of video data and one or more events occurring in an instance of the media player on the first webpage, and the first set of media player state data is associated with the video-related goal definition and the video funnel definition using the first video data identifier.

5. The computer-implemented method of claim 4, further comprising:
   receiving a second set of media player state data including data describing viewer interest in a second set of video data playable by a second instance of the media player included in a second webpage on the user device, a second video data identifier identifying the second set of video data; and
   associating the first set of media player state data, the second set of media player state data, the video-related goal definition, and the video funnel definition using the first video data identifier and the second video data identifier.

6. The computer-implemented method of claim 5, wherein the video funnel definition includes each of the interactive operations corresponding to a predetermined event, and generating the video funnel analytics further comprises analyzing the first set of media player state data and the second set of media player state data for data describing an occurrence of the one or more predetermined events corresponding to the one or more interactive operations on one or more of the first webpage and the second webpage.

7. The computer-implemented method of claim 1, further comprising:

receiving webpage usage data describing viewer interaction with the first webpage including the media player, the webpage usage data including a unique identifier; and associating the first set of media player state data with the webpage usage data using the unique identifier.

8. The method of claim 7, wherein the video funnel definition includes one or more predetermined events associated with viewer interaction with the first webpage, and generating the video funnel analytics further comprises analyzing the webpage usage data for data describing an occurrence of the one or more predetermined events on the first webpage.

9. A system for generating video funnel analytics, the system comprising:
a memory; and
a processor, coupled to the memory, to:
receive, via a user interface, a user-configurable video-related goal definition that describes a video-related goal for a video playable by a media player included in a first webpage of a website on a user device;
receive, via the user interface, a user-configurable video funnel definition that describes a video funnel based at least in part on the video-related goal definition,
wherein the video funnel definition specifies a navigational flow path that comprises a series of predetermined interactive operations to be performed by viewers of the video with respect to a first set of video data associated with the video,
wherein the series of predetermined interactive operations comprises visiting the first webpage, watching the video and visiting a set of other webpages of the website, and
wherein a satisfaction of the series of predetermined interactive operations indicates a conversion of the video-related goal;
receive a first set of media player state data describing interactions by one or more viewers of the video with the first set of video data associated with the video; and
generate video funnel analytics based at least in part on the video-related goal definition, the video funnel definition and the first set of media player state data, the video funnel analytics indicating whether the series of predetermined interactive operations were performed by the one or more viewers of the video.

10. The system of claim 9, wherein the video funnel definition includes each of the predetermined interactive operations corresponding to a predetermined event of a plurality of predetermined events, and an occurrence of one or more of the plurality of predetermined events corresponding to the conversion of the video-related goal described by the video-related goal definition.

11. The system of claim 10, wherein the processor is further to analyze the first set of media player state data for data describing the occurrence of the one or more of the plurality of predetermined events.

12. The system of claim 9, wherein the first set of media player state data includes a first video data identifier identifying the first set of video data and one or more events occurring in an instance of the media player on the first webpage, and the first set of media player state data is associated with the video-related goal definition and the video funnel definition using the first video data identifier.

13. The system of claim 12, wherein the processor is further to:
receive a second set of media player state data including data describing viewer interest in a second set of video data playable by a second instance of the media player included in a second webpage on the user device, a second video data identifier identifying the second set of video data; and associate the first set of media player state data, the second set of media player state data, the video-related goal definition, and the video funnel definition using the first video data identifier and the second video data identifier.

14. The system of claim 13, wherein the video funnel definition includes each of the interactive operations corresponding to a predetermined event, and generating the video funnel analytics further comprises analyzing the first set of media player state data and the second set of media player state data for data describing an occurrence of the one or more predetermined events corresponding to the one or more interactive operations on one or more of the first webpage and the second webpage.

15. The system of claim 9, wherein the processor is further to:
receive webpage usage data describing viewer interaction with the first webpage including the media player, the webpage usage data including a unique identifier; and
associate the first set of media player state data with the webpage usage data using the unique identifier.

16. The system of claim 15, wherein the video funnel definition includes one or more predetermined events associated with viewer interaction with the first webpage, and the processor is further to analyze the webpage usage data for data describing an occurrence of the one or more predetermined events on the first webpage.

17. A computer program product comprising a non-transitory computer readable medium encoding instructions that, in response to execution by a computing device, cause the computing device to perform operations comprising:
receiving, via a user interface, a user-configurable video-related goal definition that describes a video-related goal for a video playable by a media player included in a first webpage of a website on a user device;
receiving, via the user interface, a user-configurable video funnel definition that describes a video funnel based at least in part on the video-related goal definition,
wherein the video funnel definition specifies a navigational flow path that comprises a series of predetermined interactive operations to be performed by viewers of the video with respect to a first set of video data associated with the video,
wherein the series of predetermined interactive operations comprises visiting the first webpage, watching the video and visiting a set of other webpages of the website, and
wherein a satisfaction of the series of predetermined interactive operations indicates a conversion of the video-related goal;
receiving a first set of media player state data describing interactions by one or more viewers of the video with the first set of video data associated with the video; and
generating, by the computing device, video funnel analytics based at least in part on the video-related goal definition, the video funnel definition and the first set of media player state data, the video funnel analytics indicating whether the series of predetermined interactive operations were performed by the one or more viewers of the video.

18. The computer program product of claim 17, wherein the video funnel definition includes each of the predetermined interactive operations corresponding to a predetermined event of a plurality of predetermined events, and an occurrence of one or more of the plurality of predetermined events corresponding to the conversion of the video-related goal described by the video-related goal definition.

19. The computer program product of claim 18, wherein generating the video funnel analytics further comprises analyzing the first set of media player state data for data describing the occurrence of the one or more of the plurality of predetermined events.

20. The computer program product of claim 17, wherein the first set of media player state data includes a first video data identifier identifying the first set of video data and one or more events occurring in an instance of the media player on the first webpage, and the first set of media player state data is associated with the video-related goal definition and the video funnel definition using the first video data identifier.

21. The computer program product of claim 20, wherein the instructions cause the computing device to perform operations further comprising:

receiving a second set of media player state data including data describing viewer interest in a second set of video data playable by a second instance of the media player included in a second webpage on the user device, a second video data identifier identifying the second set of video data; and associating the first set of media player state data, the second set of media player state data, the video-related goal definition, and the video funnel definition using the first video data identifier and the second video data identifier.

22. The computer program product of claim 21, wherein the video funnel definition includes each of the interactive operations corresponding to a predetermined event of a plurality of predetermined events, and generating the video funnel analytics further comprises analyzing the first set of media player state data and the second set of media player state data for data describing an occurrence of one or more of the plurality of predetermined events corresponding to the one or more interactive operations on one or more of the first webpage and the second webpage.

23. The computer program product of claim 17, wherein the instructions cause the computer to perform operations further comprising:

receiving webpage usage data describing viewer interaction with the first webpage including an instance of the media player, the webpage usage data including a unique identifier; and associating the first set of media player state data with the webpage usage data using the unique identifier.

24. The method of claim 23, wherein the video funnel definition includes one or more predetermined events associated with viewer interaction with the first webpage, and generating the video funnel analytics further comprises analyzing the webpage usage data for data describing an occurrence of the one or more predetermined events on the first webpage.

* * * * *